United States Patent
Miyazaki et al.

(10) Patent No.: US 10,661,450 B2
(45) Date of Patent: May 26, 2020

(54) FINGER MECHANISM, ROBOT HAND AND ROBOT HAND CONTROLLING METHOD

(71) Applicant: SQUSE Inc., Kyoto-shi, Kyoto (JP)

(72) Inventors: Yoshihiro Miyazaki, Kyoto (JP); Shota Okuyama, Kyoto (JP); Yuya Wada, Kyoto (JP)

(73) Assignee: SQUSE Inc., Kyoto-shi, Kyoto (JP)

( * ) Notice: Subject to any disclaimer, the term of this patent is extended or adjusted under 35 U.S.C. 154(b) by 29 days.

(21) Appl. No.: 16/165,376

(22) Filed: Oct. 19, 2018

(65) Prior Publication Data

US 2019/0160692 A1 May 30, 2019

(30) Foreign Application Priority Data

Nov. 27, 2017 (JP) ................. 2017-227098

(51) Int. Cl.
*B25J 15/08* (2006.01)
*B25J 15/02* (2006.01)
*B25J 9/14* (2006.01)
*B25J 15/00* (2006.01)

(52) U.S. Cl.
CPC .............. *B25J 15/08* (2013.01); *B25J 9/142* (2013.01); *B25J 15/0009* (2013.01); *B25J 15/0233* (2013.01); *B25J 15/0286* (2013.01)

(58) Field of Classification Search
CPC .... B25J 15/08; B25J 15/0233; B25J 15/0009; B25J 15/0286; B25J 9/142
See application file for complete search history.

(56) References Cited

U.S. PATENT DOCUMENTS

| | | | |
|---|---|---|---|
| 5,199,320 A | 4/1993 | Spease et al. | |
| 5,647,723 A * | 7/1997 | Rush | B25J 9/1085 |
| | | | 294/111 |
| 6,247,738 B1 | 6/2001 | Winkel et al. | |
| 6,817,641 B1 * | 11/2004 | Singleton, Jr. | B25J 9/102 |
| | | | 294/106 |
| 2007/0035143 A1 * | 2/2007 | Blackwell | B25J 9/104 |
| | | | 294/111 |
| 2010/0249676 A1 | 9/2010 | Kawakami | |
| 2011/0067520 A1 | 3/2011 | Ihrke et al. | |

(Continued)

FOREIGN PATENT DOCUMENTS

| | | |
|---|---|---|
| CN | CN104842345 A | 8/2015 |
| JP | S48-95292 A | 12/1973 |

(Continued)

OTHER PUBLICATIONS

Notice of Reasons of Refusal for Japanese Application No. 2017-227098 dated May 29, 2019, with its English translation, 12 pages.

*Primary Examiner* — Stephen A Vu
(74) *Attorney, Agent, or Firm* — Bret E. Field; Bozicevic, Field & Francis LLP

(57) ABSTRACT

A finger mechanism includes a base portion and a plurality of finger portions supported by the base portion, wherein each of the finger portions includes a first bone member, a second bone member rotatably coupled to one end portion of the first bone member, and a pair of third bone members each being rotatably coupled to another end portion of the first bone member and the base portion, and forming a parallel link mechanism between the first bone member and the base portion.

15 Claims, 22 Drawing Sheets

(56) References Cited

U.S. PATENT DOCUMENTS

| | | | |
|---|---|---|---|
| 2013/0226350 A1* | 8/2013 | Bergelin | A61B 5/6806 |
| | | | 700/275 |
| 2013/0313844 A1 | 11/2013 | De La Rosa Tames et al. | |
| 2014/0222199 A1* | 8/2014 | Ihrke | B25J 15/0009 |
| | | | 700/253 |
| 2017/0067453 A1 | 3/2017 | Elettro et al. | |

FOREIGN PATENT DOCUMENTS

| | | |
|---|---|---|
| JP | S58-211884 A | 12/1983 |
| JP | S63-84089 U | 6/1988 |
| JP | H5-22811 U | 3/1993 |
| JP | H5-24007 B2 | 4/1993 |
| JP | H5-71449 B2 | 10/1993 |
| JP | H5-346193 A | 12/1993 |
| JP | H11-43105 A | 2/1999 |
| JP | 2001-188605 A | 7/2001 |
| JP | 2004-42214 A | 2/2004 |
| JP | 2004-042214 A | 2/2004 |
| JP | 2004-223687 A | 8/2004 |
| JP | 2005-246078 A | 9/2005 |
| JP | 2006-206193 A | 8/2006 |
| JP | 2008-018489 A | 1/2008 |
| JP | 2008-032140 A | 2/2008 |
| JP | 2010-063723 A | 3/2010 |
| JP | 2011-067936 A | 4/2011 |
| JP | 2011-245575 A | 12/2011 |
| JP | 2012-125847 A | 7/2012 |
| JP | 2015-221469 A | 12/2015 |
| JP | 2017-515005 A | 6/2017 |
| WO | WO9639945 A1 | 12/1996 |
| WO | WO2004-048471 A1 | 6/2004 |
| WO | WO2006-037951 A1 | 4/2006 |
| WO | WO2007-097009 A1 | 8/2007 |
| WO | WO2014-045617 A | 3/2014 |

* cited by examiner

FIG. 10

| VALVE NUMBER | I | II | III | IV | FINGER OPERATION | APPLICATION |
|---|---|---|---|---|---|---|
| VALVE FUNCTION | EXTENSOR PRESSURIZATION | EXTENSOR DEPRESSURIZATION | FLEXOR PRESSURIZATION | FLEXOR DEPRESSURIZATION | | |
| VALVE STATUS 0 | OFF | OFF | OFF | OFF | HOLDING | HOLDING OF TENDON ANTAGONISM |
| VALVE STATUS 1 | OFF | OFF | OFF | ON | | |
| VALVE STATUS 2 | OFF | OFF | ON | OFF | TIGHTENING | ADDITIONAL TIGHTENING OF OBJECT |
| VALVE STATUS 3 | OFF | OFF | ON | ON | | |
| VALVE STATUS 4 | OFF | ON | OFF | OFF | RELAXING | FINGER PULLING AFTER RELEASING, PROTECTING OF ARTIFICIAL MUSCLE AND TENDON |
| VALVE STATUS 5 | OFF | ON | OFF | ON | | |
| VALVE STATUS 6 | OFF | ON | ON | OFF | ADAPTIVE GRASPING | GRASPING OF OBJECT |
| VALVE STATUS 7 | OFF | ON | ON | ON | | |
| VALVE STATUS 8 | ON | OFF | OFF | OFF | LOOSENING | LOOSENING OF OBJECT |
| VALVE STATUS 9 | ON | OFF | OFF | ON | ADAPTIVE RELEASING | RELEASING OF OBJECT |
| VALVE STATUS 10 | ON | OFF | ON | OFF | FIXING | INITIAL FILLING OF ARTIFICIAL MUSCLE, DECREASING FLEXIBILITY OF JOINT |
| VALVE STATUS 11 | ON | OFF | ON | ON | | |
| VALVE STATUS 12 | ON | ON | OFF | OFF | | |
| VALVE STATUS 13 | ON | ON | OFF | ON | | |
| VALVE STATUS 14 | ON | ON | ON | OFF | | |
| VALVE STATUS 15 | ON | ON | ON | ON | | |

FIG. 20

QUANTITY = 1
QUANTITY = 2
...
QUANTITY = n

GRASPING POSITION = (X0, Y0, Z0)

| STORING ORDER | STORING POSITION | | | ROLLING PARAMETER | | | |
|---|---|---|---|---|---|---|---|
| | X | Y | Z | $\alpha$ | $r_a$ | $r_b$ | $\theta$ |
| 1 | X1 | Y1 | Z1 | $\alpha1$ | $r_a1$ | $r_b1$ | $\theta1$ |
| 2 | X2 | Y2 | Z2 | $\alpha2$ | $r_a2$ | $r_b2$ | $\theta3$ |
| 3 | X3 | Y3 | Z3 | $\alpha3$ | $r_a3$ | $r_b3$ | $\theta3$ |
| ...... | ...... | ...... | ...... | ...... | ...... | ...... | ...... |
| n-1 | Xn-1 | Yn-1 | Zn-1 | $\alpha n-1$ | $r_a n-1$ | $r_b n-1$ | $\theta n-1$ |
| n | Xn | Yn | Zn | $\alpha n$ | $r_a n$ | $r_b n$ | $\theta n$ |

US 10,661,450 B2

FINGER MECHANISM, ROBOT HAND AND ROBOT HAND CONTROLLING METHOD

CROSS-REFERENCE TO RELATED APPLICATIONS

This nonprovisional application claims priority under 35 U.S.C. § 119(a) on Patent Application No. 2017-227098 filed in Japan on Nov. 27, 2017, the entire contents of which are hereby incorporated by reference.

FIELD

The present application relates to a finger mechanism, a robot hand and a robot hand controlling method.

BACKGROUND

In recent years, robot hands that mimic the function of human hands for grasping an object to perform some work on it and an industrial robot with robot hands have been proposed (see Japanese Patent Application Laid-Open No. 2008-32140, No. 2011-245575, No. 2015-221469, No. 2011-67936 and No. 2004-42214).

However, conventional robot hands and industrial robots with robot hands are structured so as to open the fingertip when grasping an object or when releasing the grasped object, which makes it difficult to store multiple objects in intimate contact with one another inside a packing box.

SUMMARY

The present application is made in view of such a circumstance and aims at provision of a finger mechanism capable of storing multiple objects in intimate contact with one another inside a packing box, a robot hand and a robot hand controlling method.

According to one aspect, a finger mechanism includes a base portion and a plurality of finger portions supported by the base portion, wherein each of the finger portions includes a first bone member, a second bone member rotatably coupled to one end portion of the first bone member, and a pair of third bone members each being rotatably coupled to another end portion of the first bone member and the base portion, and forming a parallel link mechanism between the first bone member and the base portion.

According to one aspect, a robot hand includes the finger mechanism as described above, a pressurizing solenoid valve and a depressurizing solenoid valve provided midway on a supply path to supply compressed air to the Mckibben air-driven actuators included in the finger mechanism, and a control unit that controls opening and closing of the pressurizing solenoid valve and the depressurizing solenoid valve, wherein the control unit controls opening and closing of the pressurizing solenoid valve and the depressurizing solenoid valve and controls degrees of contraction of the extensor and the flexor included in the finger mechanism by adjusting an air pressure in the air-driven actuators.

According to one aspect, a robot hand controlling method, wherein the robot hand includes: the finger mechanism as described above, a pressurizing solenoid valve and a depressurizing solenoid valve provided midway on a supply path to supply compressed air to the Mckibben air-driven actuators constituting the extensor and the flexor of the finger mechanism; and a control unit that controls opening and closing of the pressurizing solenoid valve and the depressurizing solenoid valve and controls degrees of contraction of the extensor and the flexor, the method includes executing a control of opening and closing of the pressurizing solenoid valve and the depressurizing solenoid valve in order to execute at least one of the following operations by the control unit, wherein the operation includes a fixing operation to make antagonistic to each other traction forces of the extensor tendon and the flex tendon included in the finger mechanism before an operation to grasp an object, an adaptive grasping operation to grasp the object according to a shape of the object, a holding operation to hold a grasped state, an adaptive releasing operation to release the holding operation, and a relaxing operation to relax the extensor and the flexor.

According to the present application, it is possible to store multiple objects in intimate contact with one another inside a packing box.

The above and further objects and features of the invention will more fully be apparent from the following detailed description with accompanying drawings.

BRIEF DESCRIPTION OF THE DRAWINGS

FIG. 10 is an illustrative view illustrating the control states of solenoid valves I to IV;

FIG. 20 is a conceptual view depicting one example of parameters to be read by a CPU;

DESCRIPTION OF EMBODIMENTS

The present invention will be concretely described below with reference to the drawings depicting embodiments.

Embodiment 1

Figure 1:
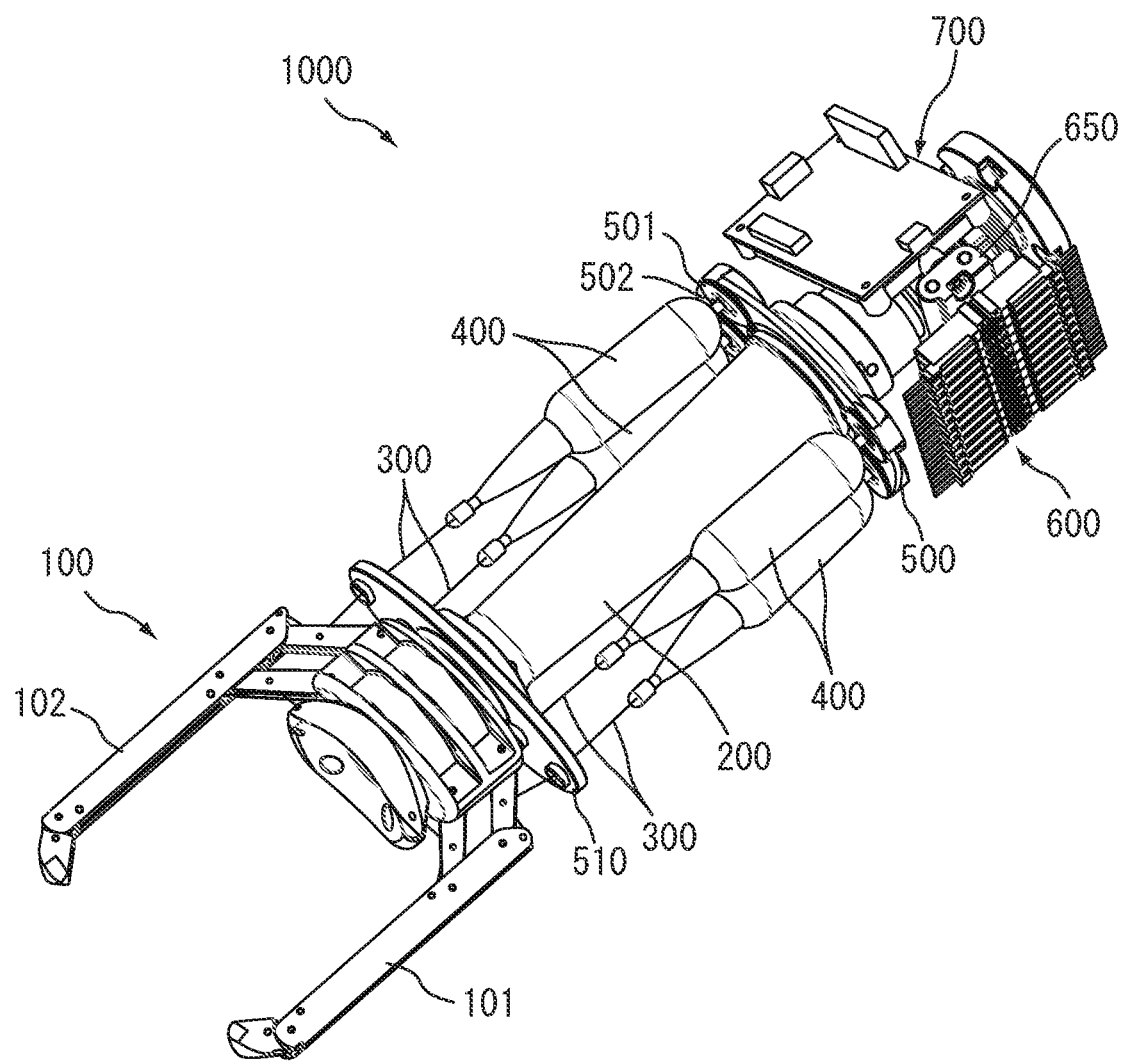
FIG. 1 is an external view illustrating a schematic structure of a robot hand according to Embodiment 1.

FIG. 1 is an external view illustrating the schematic structure of a robot hand 1000 according to Embodiment 1. The robot hand 1000 according to the present embodiment is provided with a finger mechanism portion 100, a forearm bone 200, a tendon 300, an artificial muscle 400, flanges 500 and 510, a solenoid valve 600 and a control board 700. According to the present embodiment, the finger mechanism portion 100 includes two fingers (first finger 101 and second finger 102). The first finger 101 and the second finger 102 each are structured so as to extend or flex according to the tension of the tendon 300 controlled so as to be expanded and contracted by the artificial muscle 400. A feature of the present embodiment is that by carrying out antagonistic control on the two kinds of the tendon 300 (see an extensor tendon 300A and a flex tendon 300B that will be described later, see FIG. 2), the joint angle and the force are autonomously controlled to realize control (compliance control) on the grasping form, the holding force, the flexibility of finger joint and so on. If there is no need of identifying the first finger 101 and the second finger 102 in the following description, they are merely described as fingers 101 and 102.

The artificial muscle 400 is arranged around the forearm bone 200. The forearm bone 200 corresponds to the human forearm bone and is a member corresponding to the part from the wrist joint to the arm joint. The forearm bone 200 is provided with the flange 500 at the proximal end thereof and the flange 510 at the distal end thereof. The artificial muscle 400 is, for example, a Mckibben air-driven actuator and is supplied with air from a manifold 650 to be controlled by opening and closing operation of the solenoid valve 600 so as to be controlled for the degrees of contraction. That is, if air is supplied to the inside of the artificial muscle 400 (pressurization control), the artificial muscle 400 contracts by expanding in the direction of the width thereof and flexing in the direction of the length thereof. In contrast, if air is released from the inside of the artificial muscle 400 (depressurization control), the artificial muscle 400 relaxes by flexing in the direction of the width thereof and extending in the direction of the length thereof.

The solenoid valve 600 is controlled by a CPU 701 (see FIG. 8) mounted on the control board 700. Other than the CPU 701, the control board 700 may be mounted with an input side connector and an output side connector that are used for various interfaces for making communication with the CPU 701, a coil driver that drives the coil of the solenoid valve 600, and various kinds of electronic devices such as an operational amplifier, a comparator, a transistor, a diode, a resistor and so on that process various signals, voltage and current.

The artificial muscle 400 includes the distal side end portion thereof connected to the tendon 300, and includes the proximal side end portion thereof connected to a universal joint 502. The universal joint 502 is structured so as to freely slide within a rib 501 provided at a demarcated area of the flange 500. The tendon 300 connected to the artificial muscle 400 is extended by the artificial muscle 400 contracting and shortened by the artificial muscle 400 relaxing.

While the Mckibben air-driven actuator is employed for the artificial muscle 400 in the present embodiment, a method may be adopted in which the tendon 300 is reeled up by using a motor and a pulley instead of the air-driven actuator. Moreover, the following methods and the like may be employed: a method in which the tendon 300 is directly extended and flexed by using a linear motor; and a method in which the tendon 300 is extended and flexed by using a biometal which is a fibrous actuator that extends and flexes by current flowing.

Figure 2:
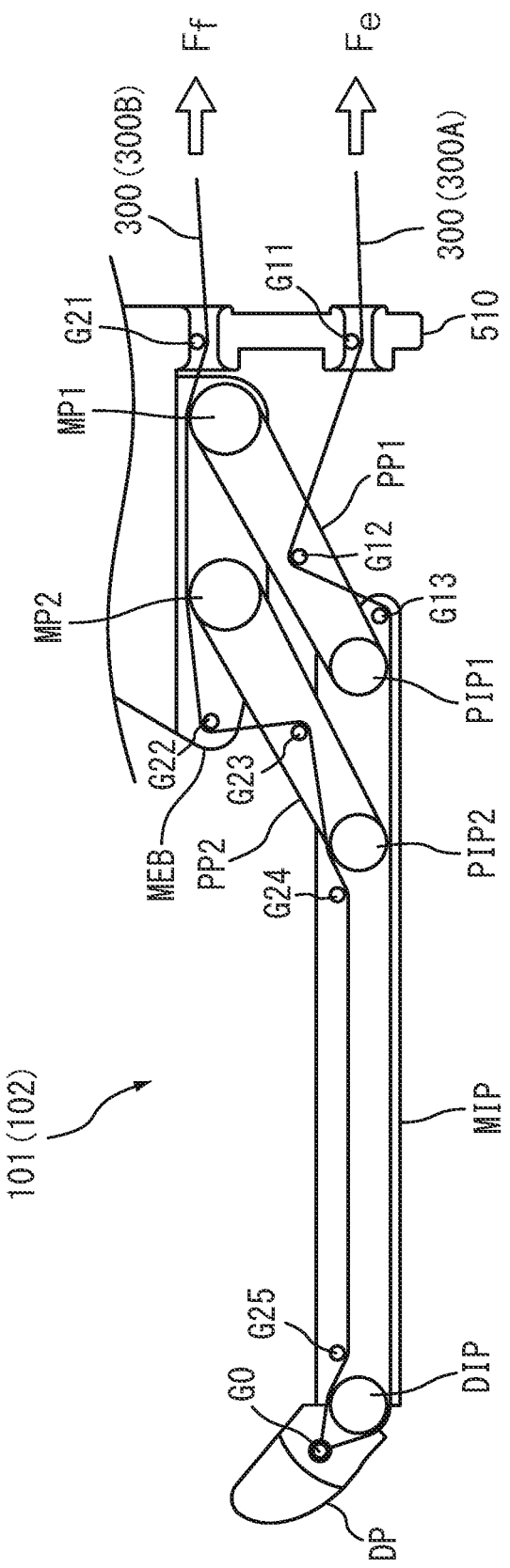
FIG. 2 is an external view of a finger mechanism portion.

FIG. 2 is an external view of the finger mechanism portion 100. The finger mechanism portion 100 according to the present embodiment is provided with two fingers including a first finger (hallux or thumb, for example) 101 and a second finger (index finger, for example) 102. Each of the fingers 101 and 102 is provided with a metacarpal bone MEB, two proximal phalanxes PP1 and PP2, a middle phalanx MIP and a distal phalanx DP from the proximal side thereof. Each of these bone members is made of acrylonitrile-butadiene-styrene (ABS) copolymer resin, for example.

The metacarpal bone MEB is secured to the distal side end portion of the forearm bone 200. The proximal phalanx PP1 is placed on the proximal side of the proximal phalanx PP2 and includes one end rotatably coupled to the metacarpal bone MEB and the other end rotatably coupled to the middle phalanx MIP. The rotation core of the proximal phalanx PP1 that is placed on the metacarpal bone MEB side constitutes a metacarpophalangeal joint MP1. The metacarpophalangeal joint MP1 includes a curved surface portion the cross sectional shape of which is partially circular or oval and is formed integrally with the proximal phalanx PP1, for example. The rotation core of the proximal phalanx PP1 that is placed on the middle phalanx MIP side constitutes a proximal interphalangeal joint PIP1. The proximal interphalangeal joint PIP1 includes a curved surface portion the cross sectional shape of which is partially circular or oval and is formed integrally with the proximal phalanx PP1, for example.

The proximal phalanx PP2 is placed on the distal side of the proximal phalanx PP1 and includes one end rotatably coupled to the metacarpal bone MEB and the other end rotatably coupled to the middle phalanx MIP. The rotation core of the proximal phalanx PP2 that is placed on the metacarpal bone MEB side constitutes a metacarpophalangeal joint MP2. The metacarpophalangeal joint MP2 includes a curved surface portion the cross sectional shape of which is partially circular or oval and is formed integrally with the proximal phalanx PP2, for example. The rotation core of the proximal phalanx PP2 that is placed on the middle phalanx MIP side constitutes a proximal interphalangeal joint PIP2. The proximal interphalangeal joint PIP2 includes a curved surface portion the cross sectional shape of which is partially circular or oval and is formed integrally with the proximal phalanx PP2, for example.

The two proximal phalanxes PP1 and PP2 include substantially the same length and form a parallel link mechanism between the metacarpal bone MEB and the middle phalanx MIP. Thus, in the case where the proximal phalanxes PP1 and PP2 rotate toward the proximal side with respect to the metacarpal bone MEB, the middle phalanx MIP is displaced toward the proximal side and the outer side (toward the back side of the hand) without changing its posture. In the case where the proximal phalanxes PP1 and PP2 rotate toward the distal side with respect to the metacarpal bone MEB, the middle phalanx MIP is displaced toward the distal side and the inner side (toward the palm side of the hand) without changing its posture.

The distal phalanx DP is a bone member shorter in the direction of the length than the middle phalanx MIP, and is rotatably coupled to the distal side end portion of the middle phalanx MIP. The rotation core of the distal phalanx DP constitutes a distal interphalangeal joint DIP. The distal interphalangeal joint DIP includes a curved surface portion the cross sectional shape of which is partially circular or oval and is formed integrally with the middle phalanx MIP, for example.

Each of the fingers 101 and 102 is provided with two tendons 300 and 300. One of the two tendons 300 and 300 is an extensor tendon 300A. The extensor tendon 300A extending from an extensor 400A, which is one of the artificial muscles 400, is guided by a tendon guide G11 provided inside a throughhole that penetrates through the flange 510 to extend to the proximal phalanx PP1, is further guided by a tendon guide G12 located in the middle of the proximal phalanx PPI and by a tendon guide G13 provided at the proximal side end portion of the middle phalanx MIP so as to be placed at the outer side of the middle phalanx (toward the back side of the hand), and further extends to the distal phalanx DP along the direction of the length of the middle phalanx MIP while keeping in contact with each of the curved surface portions of the proximal interphalangeal joints PIP1 and PIP2 and the distal interphalangeal joint DIP.

The distal side end portion of the extensor tendon 300A is fixed at a fixed end G0 provided at the distal phalanx DP. There is a concern that the fixed part where the extensor tendon 300A and the distal phalanx DP are fixed may receive tensile stress, so that the mechanical strength thereof may be deteriorated. In order to eliminate deterioration in mechanical strength, such a configuration may also be employed that they are not completely fixed, but the flex tendon 300A is attached by being tied to a part of the distal phalanx DP, for example, so that the stress is reduced.

The other one of the two tendons 300 and 300 is a flex tendon 300. The flex tendon 300B extending from a flexor 400B, which is one of the artificial muscles 400, is guided by a tendon guide G21 provided inside another throughhole that penetrates through the flange 510 and by a tendon guide G22 provided at the metacarpal bone MEB so as to extend to the proximal phalanx PP2 while keeping in contact with the curved surface portions of the metacarpophalangeal joints MP1 and MP2, is further guided by a tendon guide G23 in the middle of the proximal phalanx PP2 and by two tendon guides G24 and G25 provided at the middle phalanx MIP so as to be placed inner side of the middle phalanx MIP (toward the palm side of the hand), and extends to the distal phalanx DP along the direction of the length of the middle phalanx MIP while keeping in contact with the curved surface portion of each of the proximal interphalangeal joint PIP2 and the distal interphalangeal joint DIP.

The distal side end portion of the flex tendon 300B is fixed at the fixed end G0 provided at the distal phalanx DP. There is a concern that the fixed part where the flex tendon 300B and the distal phalanx DP are fixed may receive tensile stress, so that the mechanical strength thereof may be deteriorated. In order to eliminate deterioration in mechanical strength, such a configuration may also be employed that they are not completely fixed, but the flex tendon 300B is attached by being tied to a part of the distal phalanx DP, for example, so that the stress is reduced.

It is noted that the finger mechanism portion 100 according to the present embodiment is structured so as to have two fingers including the first finger (hallux or thumb, for example) 101 and the second finger (index finger, for example) 102, while it may be structured so as to have three or more fingers further including at least one of a third finger (middle finger, for example), a forth finger (ring finger or medicinal finger, for example) and a fifth finger (little finger, for example). The finger mechanism portion 100 according to the present embodiment is structured so as to have the same two or more fingers corresponding to the first finger 101 or the second finger 102.

Figure 8:
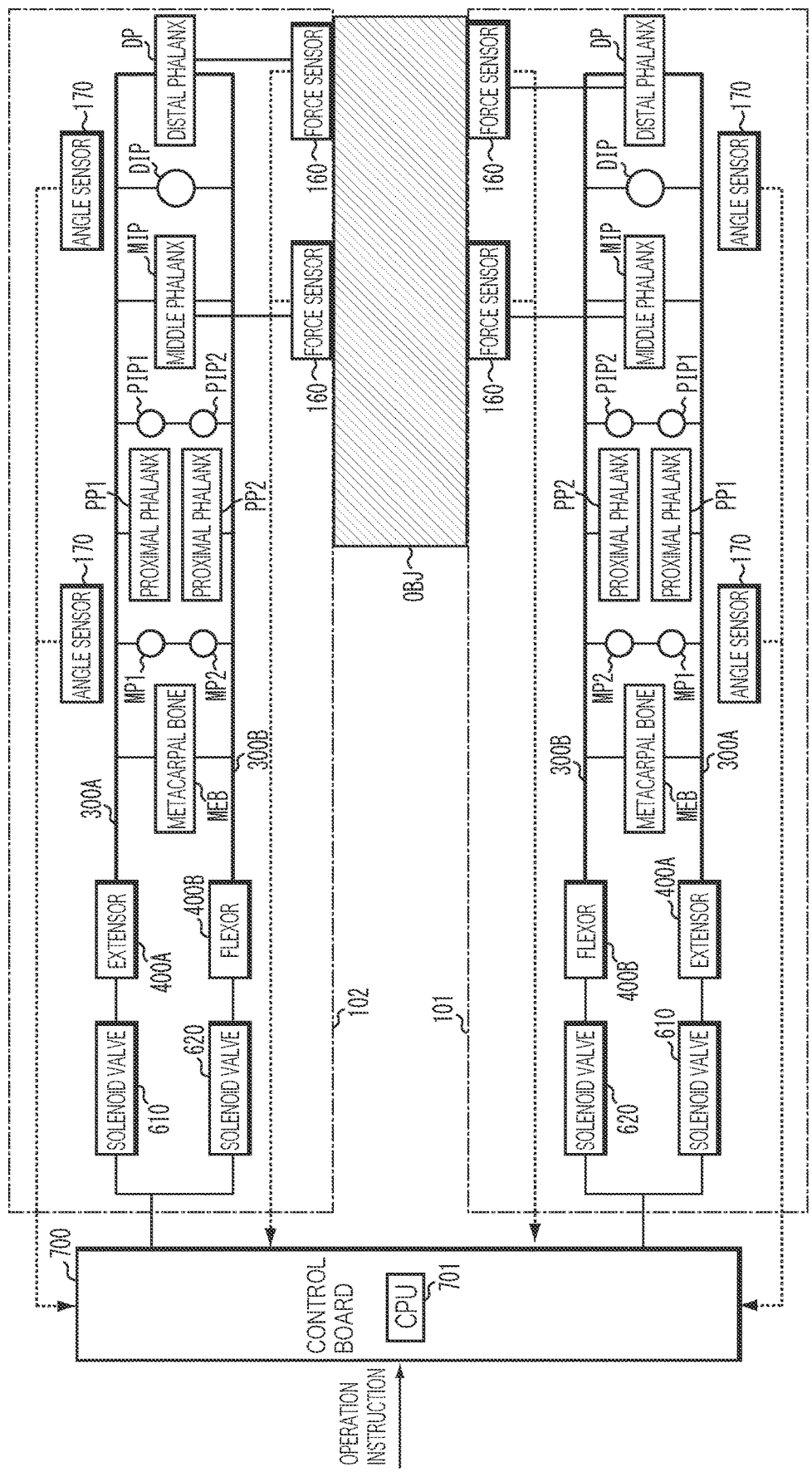
FIG. 8 is a block diagram illustrating the structure of a control system of the robot hand.

Furthermore, at least one of the distal phalanx DP and the middle phalanx MIP may be provided with a force sensor 160 that detects holding force when an object OBJ to be grasped is held in a part (i.e., the palm side of the hand) that is in contact with the object (see FIG. 8). Moreover, each joint part may be provided with an angle sensor 170 that detects an angle (joint angle) formed by the members mutually coupled to each other (see FIG. 8). These force sensor 160 and angle sensor 170 are not essential components in the finger mechanism portion 100 according to the present invention. However, in the case where the shape and the hardness of the object (OBJ) are previously known, attachment of such sensors enables automatic control on the operation range of each of the fingers.

Figure 3:
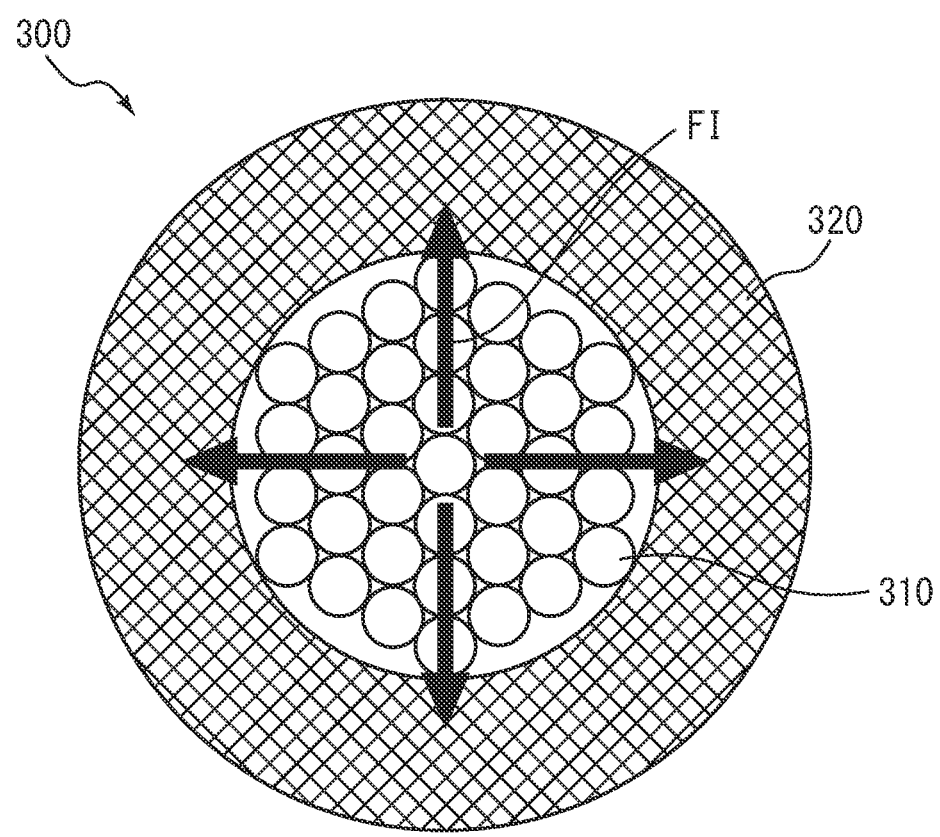
FIG. 3 is a cross-sectional view of a tendon.

FIG. 3 is a cross-sectional view of the tendon 300. The tendon 300 includes a composite structure formed of a core portion 310 that is elastically deformed by the traction force of the artificial muscle 400 and a sheath portion 320 that protects the core portion 310. For the core portion 310, a synthetic resin fiber such as nylon, polyethylene or the like the Young's modulus of which ranges, for example, from 0.5 Gpa to 2 Gpa is used.

The sheath portion 320 may be made of the same material as the core portion 310. The sheath portion 320 where a resin composition such as vinyl is woven into a cylindrical shape may be extended with smaller force than the core portion 310. The function of the sheath portion 320 is to prevent the core portion 310 from being in contact with the members such as the joints MP1, MP2, PIP1, PIP2 and DIP, the tendon guides G11 to G13 and G21 to G25 and so on, and to avoid the loss of the traction force due to friction or the like and abrasion with the core portion 310.

The tendon 300 is extended by the traction force of the artificial muscle 400 to generate internal tension FI corresponding to the extended amount. The internal tension FI that resists to the traction force is given by $A \times E \times \varepsilon$, using the cross sectional-area A of the tendon 300, the distortion $\varepsilon$ of the tendon 300 and the Young's modulus E of the tendon 300. Here, the distortion $\varepsilon$ of the tendon 300 is given by $\varepsilon = \Delta L / L0$, using the free length L0 of the tendon 300 and the extended amount $\Delta L$ of the tendon 300. The core portion 310 converts the internal tension FI into force that acts on a tendon antagonistic joint. As a term similar to the term tendon antagonistic joint, so-called antagonistic tendon driving is known. It can be said that these terms are substantially the same in that two tendons, an extensor tendon and a flex tendon are made antagonistic to each other. However, the tendon antagonistic joint is different in that importance is placed on the structure of the joint suitable for executing the antagonistic tendon driving. In other words, it can also be said that the tendon antagonistic joint according to the present embodiment is a joint having a suitable structure where the degree of the rotation of the joint may be uniquely determined by the tendons being antagonistic to each other.

The following describes an operating state of each of the fingers 101 and 102.

Figure 4:
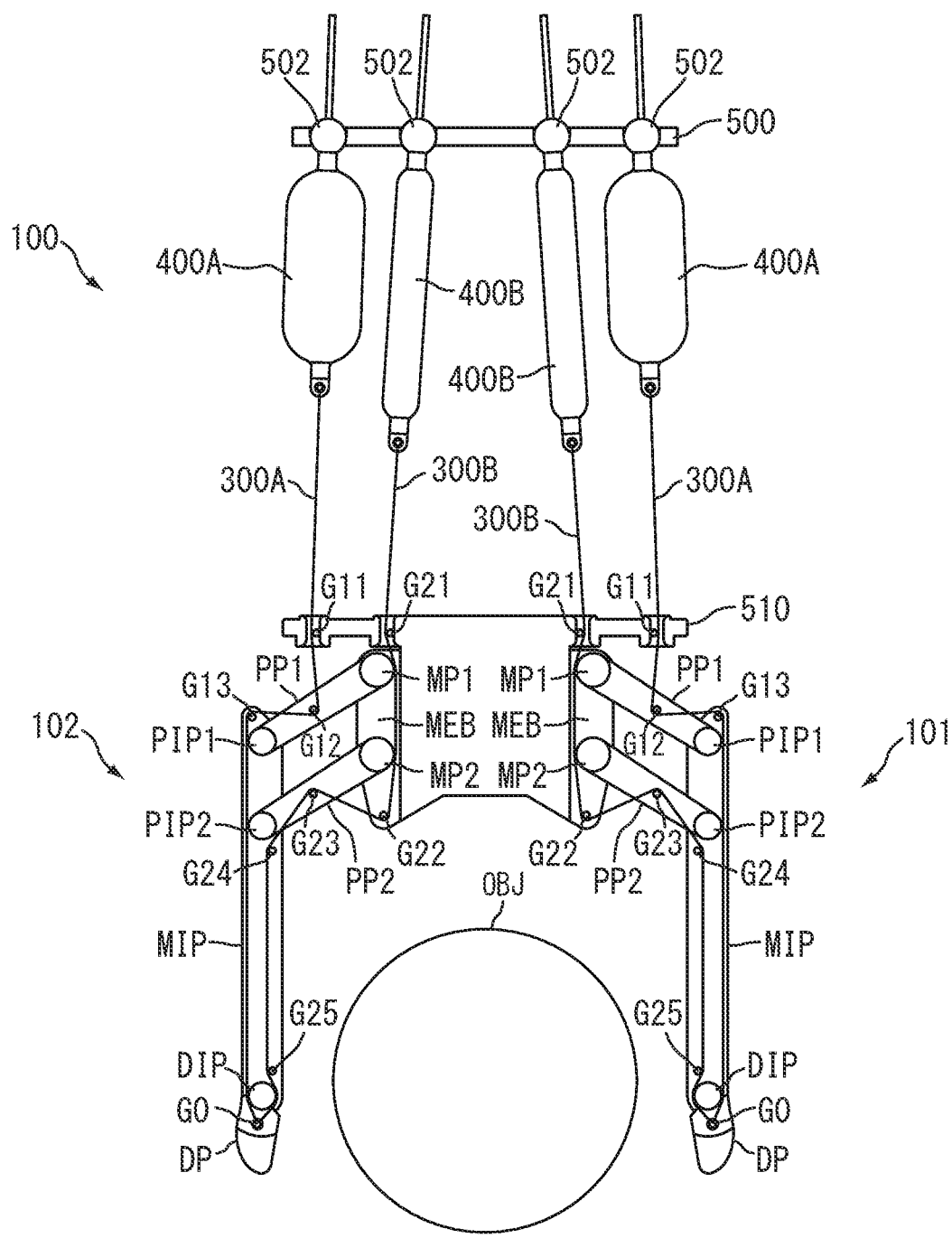
FIG. 4 is a schematic illustrative view illustrating the states of the fingers before an object is grasped.

FIG. 4 is a schematic illustrative view illustrating the states of the fingers 101 and 102 before an object OBJ is grasped. In the present embodiment, the extensors 400A are controlled into a pressurized state before grasping of the object OBJ. At this time, the extensors 400A pull the extensor tendons 300A by expanding in the direction of the width and flexing in the direction of the length. By the traction force of the extensor tendons 300A, the distal phalanxes DP of the fingertip extend with respect to the middle phalanxes MIP, and the proximal phalanxes PP1 and PP2 of each of the fingers 101 and 102 together rotate toward the proximal side. In accordance with the rotation of the proximal phalanxes PP1 and PP2, the middle phalanxes MIP of the fingers 101 and 102 are displaced toward the proximal side and the outer side (toward the back side of the hand). Thus, the middle phalanxes MIP and MIP of the two fingers 101 and 102 are pulled toward the wrist side while keeping a substantially parallel relation, and the space between the middle phalanxes MIP and MIP is enlarged at the same time.

Figure 5:
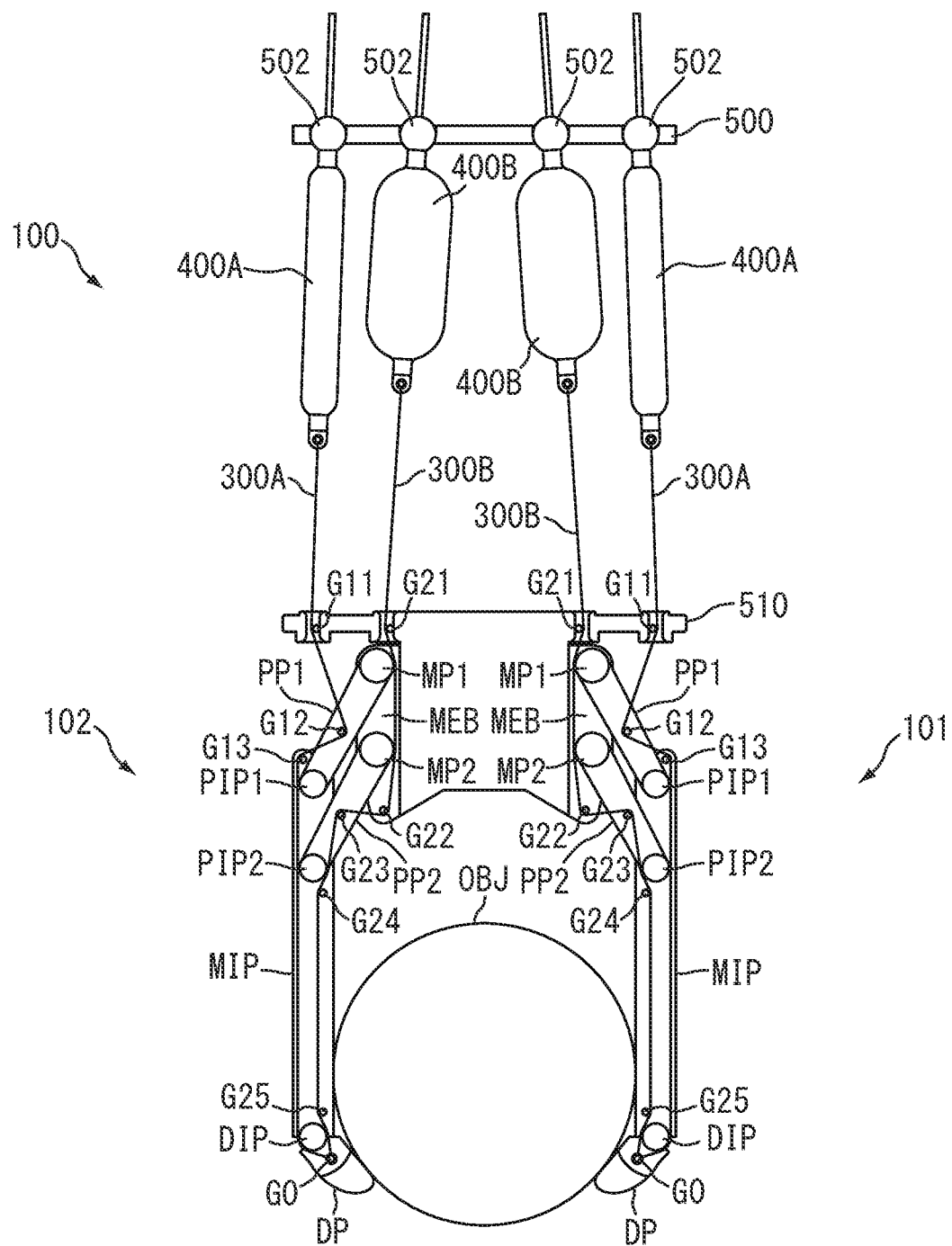
FIG. 5 is a schematic illustrative view illustrating the states of the fingers when the object is being grasped.

FIG. 5 is a schematic illustrative view illustrating the states of the fingers 101 and 102 when the object OBJ is being grasped. According to the present embodiment, the flexors 400B are controlled into a pressurized state when the object OBJ is grasped. At this time, the flexors 400B pull the flex tendons 300B by expanding in the direction of the width and flexing in the direction of the length. By the traction force of the flex tendons 300B, the distal phalanxes DP of the fingertip flex with respect to the middle phalanxes MIP, and the proximal phalanxes PP1 and PP2 of each of the fingers 101 and 102 together rotate toward the distal side. In accordance with the rotation of the proximal phalanxes PP1 and PP2, the middle phalanxes MIP of the fingers 101 and 102 are displaced toward the distal side and the inner side (toward the palm side of the hand). Thus, the middle phalanxes MIP and MIP of the two fingers 101 and 102 are sent out to the fingertip side while keeping a substantially parallel relation, and the space between the middle phalanxes MIP and MIP is shortened at the same time. By such operation, the object OBJ may be grasped with the fingers 101 and 102.

Figure 6:
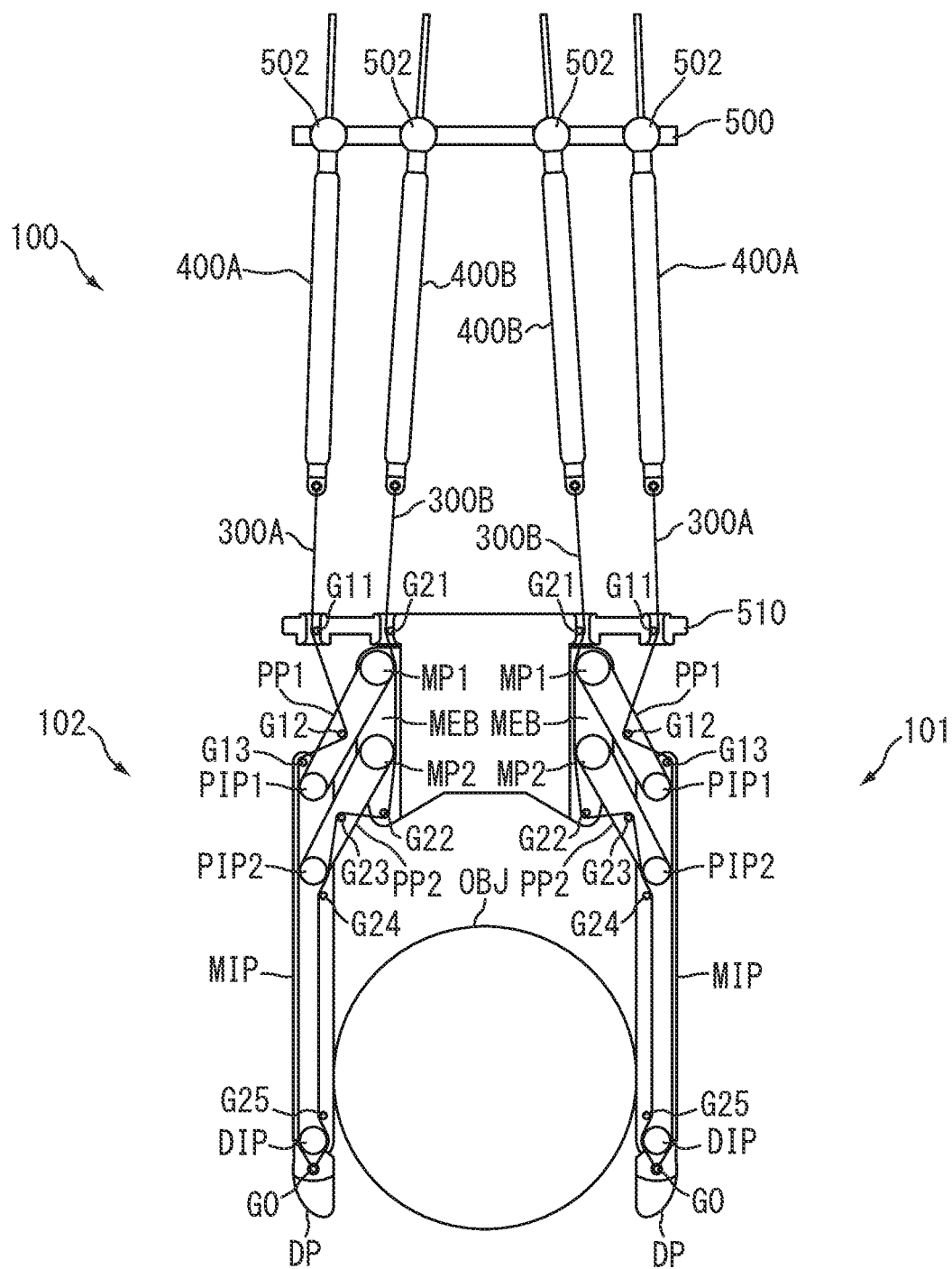
FIG. 6 is a schematic illustrative view illustrating the states of the fingers when the object is released.

FIG. 6 is a schematic illustrative view illustrating the states of the fingers 101 and 102 when the object OBJ is released. When the grasped object OBJ is released, the extensors 400A and the flexors 400B are controlled into a depressurized state so as to be relaxed. At this time, the tension of the extensor tendons 300A and the flex tendons 300B are reduced, so that the distal phalanxes DP and DP of the fingertips can be extended while keeping the space between the middle phalanxes MIP and MIP of the two fingers 101 and 102 maintained. The robot hand 1000 is lifted in this state, which makes it possible to pull out the fingers without opening the fingertip.

Figure 7:
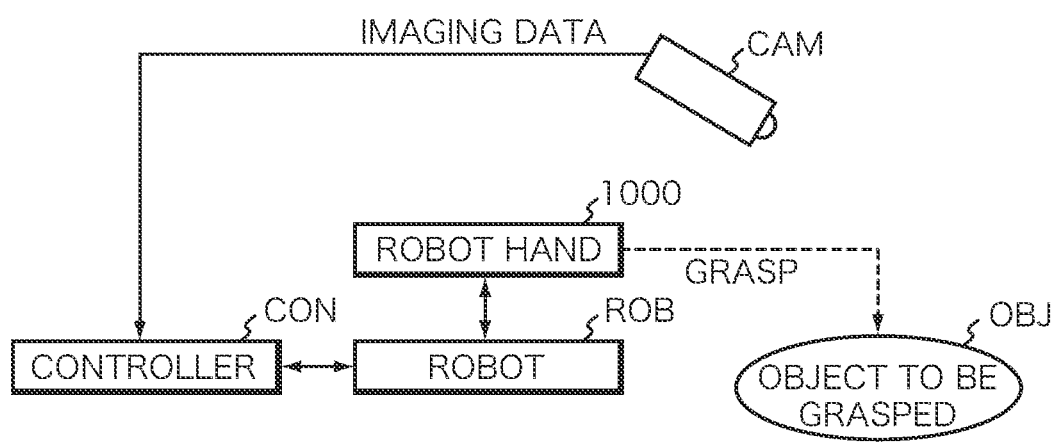
FIG. 7 is a block diagram illustrating the general structure of a robot hand system according to Embodiment 1.

FIG. 7 is a block diagram illustrating the general structure of a robot hand system according to Embodiment 1. The robot hand system according to Embodiment 1 includes the above-described robot hand 1000, a robot ROB mounted with the robot hand 1000, a controller CON that provides the robot ROB with various instructions, and an imaging device CAM that images the surrounding environment including the object OBJ.

The controller CON which is a so-called computer device includes an input interface that accepts various pieces of information, a processing circuit that performs various kinds of arithmetic processing and information processing based on the information accepted via the input interface, an output interface (not illustrated) that outputs the information generated by the processing circuit to the outside and so on. The controller CON accepts, for example, an input of a P & P condition (pick and place condition) which is a control condition for picking and placing of the object OBJ. The P & P condition may appropriately be set by a user who operates or manages the robot hand 1000 depending on the object OBJ. The object OBJ may be any object. For example, it may be a soft object such as a fruit/vegetable such as a peach or a tomato, or foodstuff such as a croquette or a piece of fried chicken. Furthermore, it may be an object having an indefinite shape such as a salad or a ready-to-eat dish. Moreover, the object OBJ may be a comparatively small object such as a toy. The P & P condition may include a condition such as the weight, shape, softness, color, gloss and the like of the object OBJ, for example.

The robot ROB which is, for example, N-JIKU (the registered trademark of the applicant) is connected to the controller CON and mounted with the robot hand 1000. To the robot ROB, various conditions including the above-described P & P condition are input through the controller CON. The robot ROB provides the robot hand 1000 with various pieces of data and various operation instructions depending on the object OBJ such as a joint angle and a grasping force based on the various conditions input through the controller CON.

When an operation instruction concerning the grasping of the object OBJ is accepted, the robot hand 1000 enters the operation of grasping the object OBJ. In the grasping operation, information on the surrounding environment of the place where the object OBJ is placed may be required. The controller CON is capable of obtaining information on the surrounding environment of the place where the object OBJ is placed, for example, by obtaining the imaging data of the surrounding environment where the object OBJ is placed from the imaging device CAM and analyzing the obtained imaging data. Furthermore, the controller CON may obtain the three-dimensional information on the object OBJ to determine the grasping position, the grasping posture and the like by analyzing the imaging data obtained from the imaging device CAM. The controller CON provides an operation instruction conforming to the object OBJ based on the information related to the surrounding environment of the object OBJ and the three-dimensional information obtained by analyzing the input P&P condition and imaging data. The robot hand 1000 performs autonomous control on the joint angle and the force at the finger mechanism portion 100 based on the operation instruction supplied from the controller CON, thereby realizing control (compliance control) on the grasping form, the holding force, the flexibility of finger joint and the like.

Note that in the case where the information related to the surrounding environment of the object OBJ may previously be provided to the controller CON, this eliminates the need for the imaging data sent from the imaging device CAM. Thus, the imaging device CAM is not required to be included in the robot hand system.

FIG. 8 is a block diagram illustrating the structure of a control system of the robot hand 1000. FIG. 8 illustrates the connection among the joints, artificial muscles 400 and tendons 300 of the finger mechanism portion 100 and solenoid valves 610 and 620 that constitute the robot hand 1000.

The first finger 101 includes the distal phalanx DP, the middle phalanx MIP, the proximal phalanxes PP1 and PP2 and the metacarpal bone MEB. The distal phalanx DP and the middle phalanx MIP are each attached with the force sensor 160. The force sensor 160 detects the contact force that the first finger 101 provides to the object OBJ. As is apparent from the description given above, the bone members are rotatably coupled together via the distal interphalangeal joint DIP, the proximal interphalangeal joints PIP1 and PIP2 and the metacarpophalangeal joints MP1 and MP2. The distal interphalangeal joints DIP and the metacarpophalangeal joint MP1 are each attached with the angle sensor 170. The angle sensor 170 detects the joint angle, that is, the angle of the relative inclination between the bones, and outputs it to the CPU 701.

The basic control on the first finger 101 is performed by providing the CPU 701 mounted on the control board 700 of the robot hand 1000 with various operation instructions. The operation instructions may be provided by the controller CON illustrated in FIG. 7, for example.

When, for example, a grasping instruction for grasping the object OBJ is input via an external input means such as the controller CON or the like, the CPU 701 transmits control signals to flex and extend the finger 101 to the solenoid valves 610 and 620. The solenoid valves 610 and 620 having received the control signals perform supply and exhaust control so that the artificial muscle 400 extends and flexes. The supply and exhaust control is specifically pressurization control for supplying air to the inside of the artificial muscle 400 or depressurization control for exhausting air therefrom.

By the extension and contraction of the artificial muscles 400, traction forces to pull the extensor tendon 300A and the flex tendon 300B are caused, whereby tension occurs on each of the extensor tendon 300A and the flex tendon 300B. The tension becomes moment for rotating each of the joints. That is, the tension working on each of the extensor tendon 300A and the flex tendon 300B acts as the moment that rotates the distal interphalangeal joint DIP, the proximal interphalangeal joints PIP1 and PIP2 and the metacarpophalangeal joints MP1 and MP2.

The structure of the second finger 102 is the same as that of the first finger 101. That is, the second finger 102 includes the distal phalanx DP, the middle phalanx MIP, the proximal phalanxes PP1 and PP2 and the metacarpal bone MEB. The distal phalanx DP and the middle phalanx MIP are each attached with the force sensor 160. The force sensor 160 detects the contact force that the second finger 102 provides to the object OBJ. As is apparent from the description given above, the bone members are rotatably coupled together via the distal interphalangeal joint DIP, the proximal interphalangeal joints PIP1 and PIP2 and the metacarpophalangeal joints MP1 and MP2. The distal interphalangeal joints DIP and the metacarpophalangeal joint MP1 are each attached with the angle sensor 170. The angle sensor 170 detects the joint angle, that is, the angle of the relative inclination between the bones, and outputs it to the CPU 701.

Basic control on the second finger 102 is performed by providing the CPU 701 mounted on the control board 700 of the robot hand 1000 with various operation instructions. The operation instructions may be provided by the controller CON illustrated in FIG. 7, for example.

When, for example, a grasping instruction for grasping the object OBJ is input via an external input means such as the controller CON or the like, the CPU 701 transmits control signals to flex and extend the finger 102 to the solenoid valves 610 and 620. The solenoid valves 610 and 620 having received the control signals perform supply and exhaust control so that the artificial muscle 400 extends and flexes. The supply and exhaust control is specifically pressurization control for supplying air to the inside of the artificial muscle 400 or depressurization control for exhausting air therefrom.

By the extension and contraction of the artificial muscles 400, traction forces to pull the extensor tendon 300A and the flex tendon 300B are caused, whereby tension occurs on each of the extensor tendon 300A and the flex tendon 300B. The tension becomes moment for rotating each of the joints. That is, the tension working on each of the extensor tendon 300A and the flex tendon 300B acts as the moment that rotates the distal interphalangeal joint DIP, the proximal interphalangeal joints PIP1 and PIP2 and the metacarpophalangeal joints MP1 and MP2.

The force sensors 160 attached to the first finger 101 and the second finger 102 output the sensor values concerning the contact force to the CPU 701. Moreover, the angle sensors 170 attached to the joints of the first finger 101 and the second finger 102 output the sensor values concerning the joint angles of the joints to the CPU 701. These sensor values may be output to the controller CON via the control board 700. The user of the robot hand 1000 may determine whether to maintain, or change or modify the current status of the P & P condition based on the sensor values from the force sensor 160 and the angle sensor 170.

The operation and control of the robot hand 1000 and the finger mechanism portion 100 described above are to feed back the grasping force and the joint angles and successively adjust and control the control conditions in accordance with the size, shape, softness and the like of the object OBJ. This is the compliance control of the robot hand.

Figure 9:
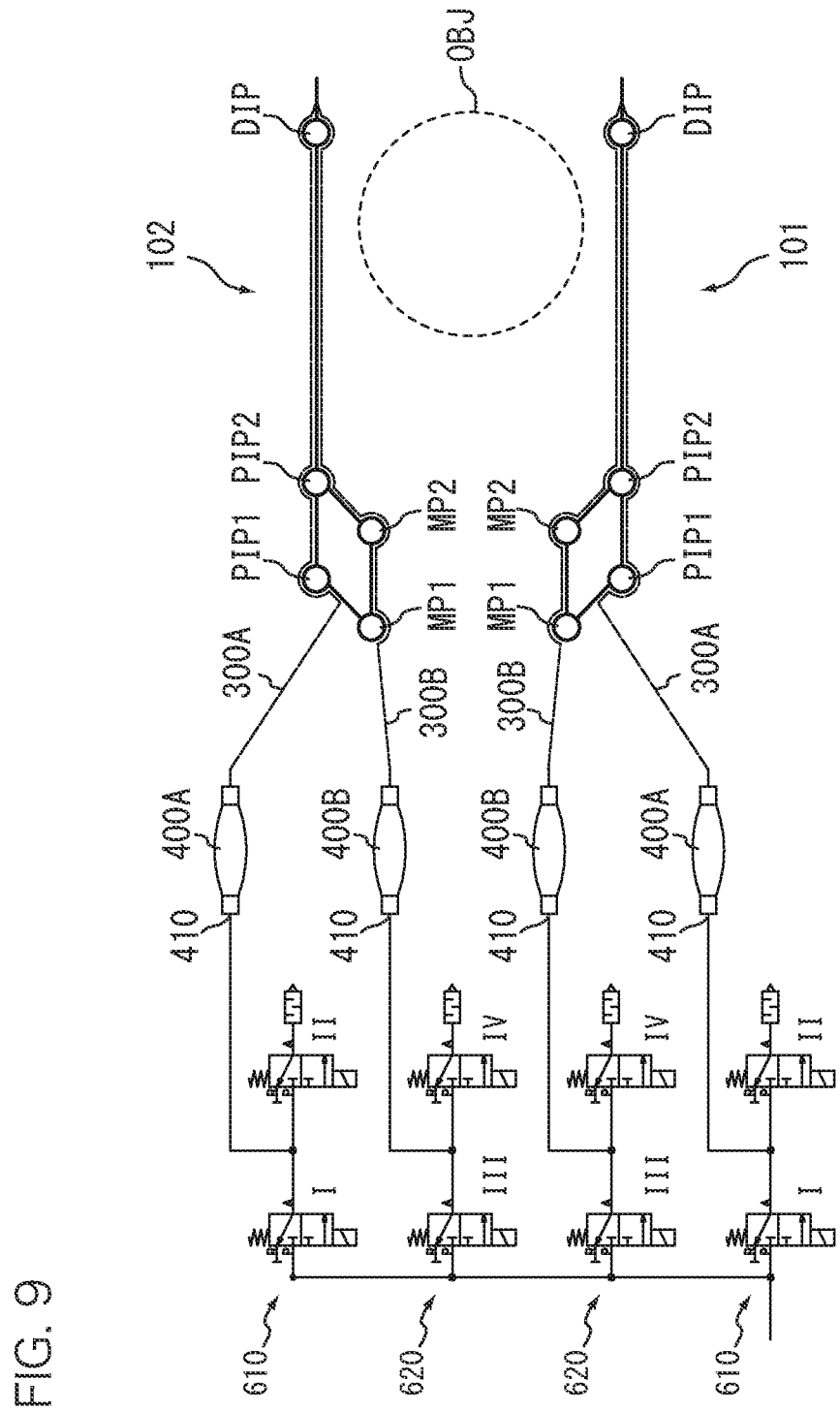
FIG. 9 is an illustrative view illustrating a traction force transmitting mechanism in the finger mechanism portion.

FIG. 9 is an illustrative view illustrating a traction force transmitting mechanism in the finger mechanism portion 100. FIG. 9 illustrates the connection among the joints, artificial muscles, tendons of the finger mechanism portion 100 and solenoid valves and depicts a state where the first finger 101 and the second finger 102 are in the vicinity of the object OBJ.

The first finger 101 and the second finger 102 each include the distal interphalangeal joint DIP, the proximal interphalangeal joints PIP1 and PIP2 and the metacarpophalangeal joint MP1 and MP2. On the curved surface portions (arc-shaped portions) of each of the joints, the extensor tendon 300A and the flex tendon 300B are suspended, and are extended from the proximal side toward the distal side. One ends of the extensor tendon 300A and the flex tendon 300B are respectively connected to one ends of the extensor 400A and the flexor 400B, and the other ends of the extensor 400A and the flexor 400B are connected to one ends of the air supply nozzles/suction nozzles 410. The other ends of air supply nozzles/suction nozzles 410 are connected to the solenoid valves 610 and 620.

Now, by using as an example the solenoid valves 610 and 620 that drive the first finger, the sharing, workings and the like of the operations thereof will be described. The solenoid valve 610 is composed of two valves of a solenoid valve I and a solenoid valve II. The solenoid valve I acts to pressurize the extensor 400A to thereby expand the extensor 400A in the direction of the width. When the extensor 400A expands in the direction of the width, the extensor tendon 300A is pulled in the direction of the length of the extensor 400A. The valve function of the solenoid valve I providing such workings is referred to as "extensor pressurization" in the specification of the present application.

The solenoid valve II acts to depressurize the extensor 400A to thereby flex the extensor 400A in the direction of the width and expand it in the direction of the length. When the extensor 400A extends in the direction of the length, the extensor tendon 300A moves toward the proximal interphalangeal joint PIP 1. The valve function of the solenoid valve II providing such workings is referred to as "extensor depressurization" in the specification of the present application.

The solenoid valve III acts to pressurize the flexor 400B to expand the flexor 400B in the direction of the width. When the flexor 400B expands in the direction of the width, the flex tendon 300B is pulled in the direction of the length of the flexor 400B. The valve function of the solenoid valve III providing such workings is referred to as "flexor pressurization" in the specification of the present application.

The solenoid valve IV acts to depressurize the flexor 400B to thereby flex the flexor 400B in the direction of the width and extend in the direction of the length. When the longitudinal direction of the flexor 400B extends in the direction of the length, the flex tendon 300B moves toward the metacarpophalangeal joint MP1. The valve function of the solenoid valve IV providing such workings is referred to as "flexor depressurization" in the specification of the present application.

As is apparent from the description given above, in the robot hand 1000 according to the present embodiment, since the four solenoid valves I to IV are used to control the extensor tendon 300A and the flex tendon 300B when rotating the joints of the first finger 101, sixteen possible control states may be caused by combinations of ON and OFF of the solenoid valves I to IV. The same applies to the second finger 102. That is, the extensor tendon 300A and the flex tendon 300B may be controlled by using four solenoid valves I to IV, so that sixteen possible control states can be created for each of the fingers by combinations of ON and OFF of the solenoid valves I to IV.

FIG. 10 is an illustrative view illustrating the control states of the solenoid valves I to IV. FIG. 10 depicts a relationship among the ON and OFF operation of the solenoid valves I, II, III and IV as illustrated in FIG. 9, the valve function of the valves and the operation of the finger mechanism portion 100.

The valve function of the solenoid valve I includes "extensor pressurization." The "extensor pressurization" is operation to expand the extensor 400A in the direction of the width by pressurizing the extensor 400A by air supply so that the extensor tendon 300A are pulled toward the extensor 400A.

The valve function of the solenoid valve II includes "extensor depressurization." The "extensor depressurization" is operation to flex the extensor 400A in the direction of the width and extend it in the direction of the length by depressurizing the extensor 400A, that is, to relax the extensor tendon 300A toward the proximal interphalangeal joint PIP1.

The valve function of the solenoid valve III includes "flexor pressurization." The "flexor pressurization" is operation to expand the flexor 400B in the direction of the width and flex it in the direction of the length by pressurizing the flexor 400B by air supply so that the flex tendon 300B is pulled toward the extensor 400A.

The valve function of the solenoid valve IV includes "flexor depressurization." The "flexor depressurization" is operation to flex the flexor 400B in the direction of the width and extend it in the direction of the length by depressurizing the flexor 400B, that is, to relax the flex tendon 300B toward the metacarpophalangeal joint MP1.

Sixteen valve states (control states) are prepared by switching the combinations of ON and OFF of the solenoid valves I to IV. The valve state 0 indicates a state where the solenoid valves I to IV are all OFF. In the valve state 0, the extensor tendon 300A and the flex tendon 300B are placed in a state of being antagonistic to each other.

The valve state 1 is a control state where only the solenoid valve IV is ON while the remaining three solenoid valves are OFF.

The valve state 2 is a control state where only the solenoid valve III is ON while the remaining three solenoid valves I, II and IV are OFF. The valve state 2 is used when so-called "additional tightening of the object" is performed in which, by expanding the flexor 400B in the direction of the width, the flex tendon 300B is pulled toward the flexor 400B to increase the strength of the contact between each of the joints and the object OBJ.

In the valve state 3, the solenoid valves I and II are OFF while the solenoid valves III and IV are ON. In the valve state 3, the flexor pressurization and the flexor depressurization may be used in combination. By combining two kinds of pressure and the control time, transient control that cannot be expected for normal control may be realized.

The valve state 4 is a control state where only the solenoid valve II is ON while the remaining three solenoid valves I, III and IV are OFF.

In the valve state 5, the solenoid valves II and IV are ON while the solenoid valves I and III are OFF. The valve state 5 is employed when so-called finger pulling to remove the fingers from the object OBJ with which they are in contact is performed. By simultaneously performing the extensor depressurization and the flexor depressurization, the artificial muscle 400 is relaxed, which eliminates unnecessary force applied to each of the joints and each of the tendons 300 to thereby prevent them from deteriorating.

In the valve state 6, the solenoid valves II and III are ON while the solenoid valves I and IV are OFF. The valve state 6 is employed when the object OBJ is grasped. A preferred finger attitude when the object OBJ is grasped is a state where the force on the palm side that is in contact with the object OBJ is increased while the force on the back side of the hand is relaxed. Thus, the extensor 400A is depressurized while the flexor 400B is pressurized.

In the valve state 7, the solenoid valve I is OFF while the remaining solenoid valves II to IV are all ON. In the valve state 7, the states of the solenoid valves III and IV are the same as those of the valve state 3 and are both ON.

In the valve state 8, the solenoid valve I is ON while the remaining solenoid valves are all OFF. In the valve state 8, the ON and OFF states of the solenoid valve are reverse to those of the valve state 7. In the valve state 8, the extensor 400 (extensor tendon 300A) is tensioned, and the joints are arranged in a straight line. By performing control into the valve state 8, pressurization to the object OBJ is released.

In the valve state 9, the solenoid valves I and IV are ON while the solenoid valves II and III are OFF. In the valve state 9, the extensor 400A (extensor tendon 300A) is tensioned while the flexor 400B (flex tendon 300B) is relaxed, which brings about a state the most suitable for releasing the fingers from the object OBJ.

In the valve state 10, the solenoid valves I and III are ON while the solenoid valves II and IV are OFF. In the valve state 10, the extensor 400A (extensor tendon 300A) and the flexor 400B (flex tendon 300B) are both tensioned to thereby place the extensor 400A (extensor tendon 300A) and the flexor 400B (flex tendon 300B) in a state of being antagonistic to each other. Such a state is employed when the initialized state of each of the artificial muscles 400 is checked or when tightening of each of the joints, i.e. the flexibility of the joint, is decreased.

The robot hand 1000 may employ the states indicated by valve states 11-15 by combinations of the solenoid valves I to IV. For example, by controlling the valve state into the valve state 11, various changes may be given to the operation of the flexor 400B by combinations of the depressurization magnitude and the depressurization time.

In the valve states 12-14, since pressurization and depressurization of the extensor 400A (extensor tendon 300A) may simultaneously be made ON, various changes may be given to the operation of the extensor 400A depending on the depressurization magnitude and the depressurization time as well as the combination of the pressurization magnitude and the pressurization time.

In the valve state 15, the pressurization and depressurization of the flexor 400B (flex tendon 300B) are simultaneously turned on as well as the pressurization and depressurization of the extensor 400A (extensor tendon 300A) are simultaneously turned on, which enables the operation of the extensor 400A and the flexor 400B in combination. In the control of the finger mechanism according to the present embodiment, by rotating each of the joints with the use of the four solenoid valves I to IV and the two artificial muscles 400 (extensor 400A and flexor 400B) for one finger, a feature of allowing the fingers to perform a wide variety of operation is provided.

The following describes a control method of the robot hand 1000.

Figure 11:
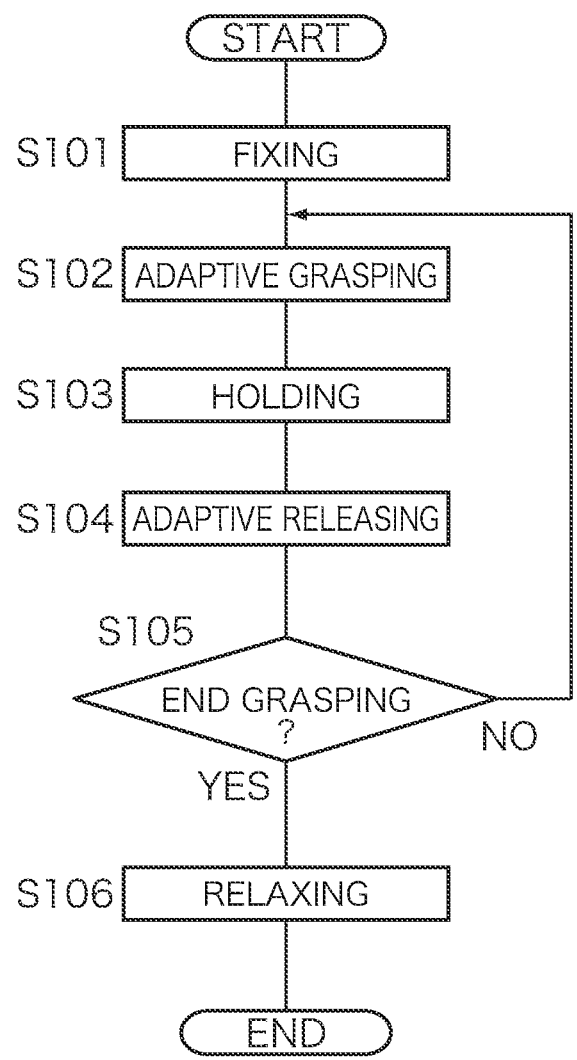
FIG. 11 is a flowchart depicting the control method of the robot hand according to Embodiment 1.

FIG. 11 is a flowchart depicting the control method of the robot hand 1000 according to Embodiment 1. When an operation instruction concerning the start of grasping is accepted from the controller CON, the CPU 701 mounted on the control board 700 provided in the robot hand 1000 executes fixing control (step S101). Here, the fixing control is to place the traction force of the extensor tendon 300A and the traction force of the flex tendon 300B in an initialized state where they are antagonistic to each other. More specifically, the CPU 701 controls ON and OFF of the solenoid valves I to IV into the above-described valve state 10, and controls the extensor 400A and the flexor 400B both into a pressurized state. The extensor 400A and the flexor 400B both expand in the direction of the width and flex in the direction of the length, which pulls the extensor tendon 300A and the flex tendon 300B so that the traction force thereof is antagonistic to each other.

Then, the CPU 701 shifts the control state of the finger mechanism portion 100 to adaptive grasping (step S102). The adaptive grasping is operation to place the fingers of the finger mechanism portion 100 along the contour of the object OBJ and make the robot hand 1000 start to grasp the object OBJ. More specifically, the CPU 701 controls ON and OFF of the solenoid valves I to IV into the above-described valve state 6 and controls the extensor 400A into a depressurized sate and the flexor 400B into a pressurized state. Reducing the tension of the extensor tendon 300A enables control to lay each of the fingers of the finger mechanism portion 100 along the object OBJ. It is noted that the shift from the fixing control at step S101 to the adaptive grasping at step S102 may be made in response to reception of an operation instruction from the controller CON or may automatically be executed after a set time has elapsed from the shift to the fixing control.

Then, the CPU 701 shifts the control state of the finger mechanism portion 100 to holding (step S103). The holding is operation to hold the object OBJ grasped by the robot hand 1000. More specifically, the CPU 701 controls ON and OFF of the solenoid valves I to IV into the above-described valve state 0 and performs control such that the tension of the extensor tendon 300A and the tension of the flex tendon 300B are held. It is noted that the shift from the adaptive grasping at step S102 to the holding at step S103 may be made in response to reception of an operation instruction from the controller CON or may automatically be executed after a set time has elapsed from the shift to the adaptive grasping.

If accepting an operation instruction to provide an instruction to release the grasping operation from the controller CON, the CPU 701 controls the control state of the finger mechanism portion 100 to adaptive releasing (step S104). The adaptive releasing is operation to release the holding operation at step S103. The CPU 701 controls ON and OFF of the solenoid valves I to IV into the above-described valve state 9 and controls the extensor 400A into a pressurized sate and the flexor 400B into a depressurized state. By increasing the tension of the extensor tendon 300A and reducing the tension of the flex tendon 300B, the holding operation may be released.

Subsequently, the CPU 701 determines whether or not the grasping work is to be ended (step S105). If an operation instruction concerning a grasping end instruction is accepted from the controller CON, the CPU 701 determines that the grasping work is to be ended. If the CPU 701 determines that the grasping work is not to be ended (S105: NO), the CPU 701 returns the processing to step S102 to execute a series of processing from steps S102 to S104 in order to grasp another object OBJ.

Meanwhile, if determining that the grasping work is to be ended (S105: YES), the CPU 701 controls the control state of the finger mechanism portion 100 to relaxing (step S106). The relaxing is operation for finger pulling to prevent the finger mechanism portion 100 from being in contact with the object OBJ and a box, a container or the like containing the object OBJ and is operation for protecting the tendon 300 and the artificial muscle 400. The CPU 701 controls ON and OFF of the solenoid valves I to IV into the above-described valve state 5 and controls the extensor 400A and the flexor 400B both into a depressurized state.

While control to any of the valve states 0 to 16 is performed in the present embodiment, a structure may be employed in which two valve states are alternately switched in a time-dependent manner. By switching the states of the extensor pressurization, the extensor depressurization, the flexor pressurization and the flexor depressurization in a time-dependent manner, transition control that cannot be expected for the normal control may be achieved.

As described above, according to Embodiment 1, the rotation cores corresponding to the joints are rotated by the tension of the extensor tendon 300A and the flex tendon 300B, and the rotation cores are autonomously stopped in the state where the tension of the extensor tendon 300A is balanced with the tension of the flex tendon 300B. Thus, a soft object having an indefinite shape can be grasped without being crushed. Furthermore, according to Embodiment 1, the tension may be uniquely determined by physical properties of the extensor tendon 300A and the flex tendon 300B.

Additionally, according to the present embodiment, the metacarpal bone MEB, the proximal phalanxes PP1 and PP2 and the middle phalanx MIP form parallel link mechanism. Thus, it is possible to grasp the object OBJ without opening the fingertip and to pull out the fingers without opening the fingertip upon releasing the grasped object OBJ as well.

Embodiment 2

In Embodiment 2, description is made on feedback control performed based on the outputs from an angle sensor and a force sensor included in the finger mechanism portion 100.

Figure 12:
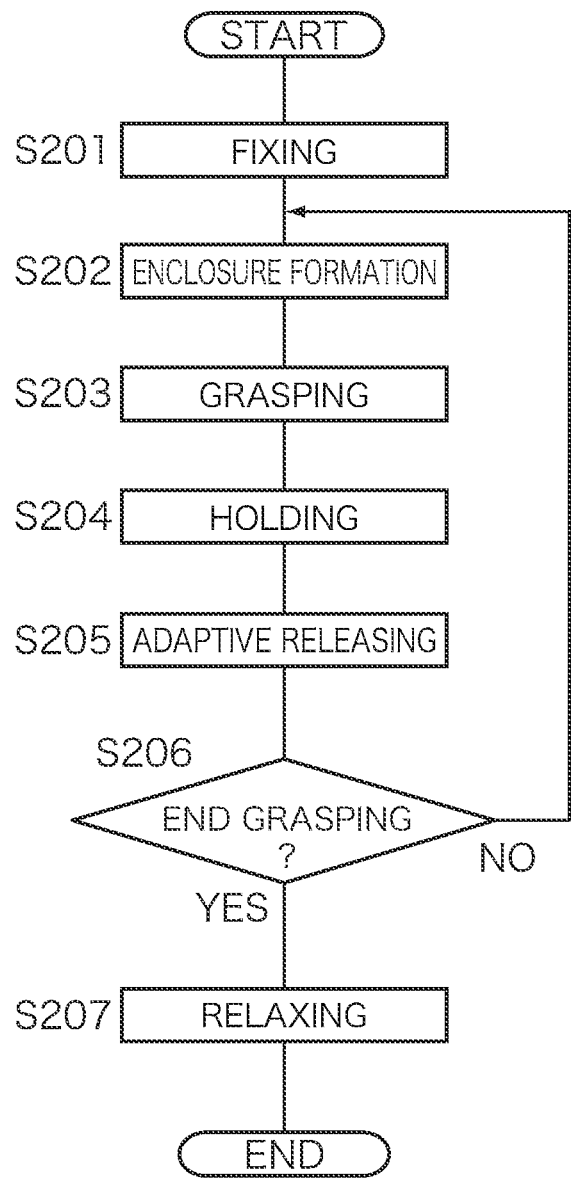
FIG. 12 is a flowchart depicting the control procedure of a robot hand according to Embodiment 2.

FIG. 12 is a flowchart depicting the control procedure of a robot hand 1000 according to Embodiment 2. When an operation instruction concerning the start of grasping is accepted from the controller CON, the CPU 701 mounted on the control board 700 provided in the robot hand 1000 executes fixing control (step S201). Here, the fixing control is to place the traction force of the extensor tendon 300A and the traction force of the flex tendon 300B in an initialized state where they are antagonistic to each other. More specifically, the CPU 701 controls ON and OFF of the solenoid valves I to IV into the above-described valve state 10 and controls the extensor 400A and the flexor 400B both into a pressurized state. The extensor 400A and the flexor 400B both expand in the direction of the width and flex in the direction of the length, which pulls the extensor tendon 300A and the flex tendon 300B so that the traction force thereof is antagonistic to each other.

Subsequently, the CPU 701 shifts the control state of the finger mechanism portion 100 to enclosure formation (step S202). The enclosure formation is to determine the permissible range and the permissible region of the operation when the robot hand 1000 is mounted on the robot ROB to grasp and release the object OBJ. The robot hand 1000 is required to behave according to the size and the shape of the object OBJ as well as the condition of the surroundings where the object OBJ is placed and the condition of the surroundings where the object OBJ is stored. For example, when a peach is placed in a box or when a peach is taken out from a box, since it is necessary that the angle of the finger mechanism be different between the end and the middle of the box, the enclosure formation is set in view of such a situation. In view of such situation, the enclosure formation is set. It is noted that the control procedure of the enclosure formation will be described in detail with reference to the flowchart in FIG. 13.

Then, the CPU 701 shifts the control state of the finger mechanism portion 100 to grasping (step S203). The grasping is substantially the same as the adaptive grasping described in Embodiment 1, and is operation to place the fingers of the finger mechanism portion 100 along the object OBJ according to the shape of the object OBJ and make the robot hand 1000 start to grasp the object OBJ. It is noted that the control procedure of grasping will be described in detail with reference to the flowchart illustrated in FIG. 14.

Then, the CPU 701 shifts the control state of the finger mechanism portion 100 to holding (step S204). The holding is operation to hold the object OBJ grasped by the robot hand 1000. More specifically, the CPU 701 controls ON and OFF of the solenoid valves I to IV into the above-described valve state 0 and performs control such that the tension of the extensor tendon 300A and the tension of the flex tendon 300B are held. It is noted that the shift from the grasping at step S203 to the holding at step S204 may be made in response to reception of an operation instruction from the controller CON or may automatically be executed after a set time has elapsed from the shift to the held state.

If accepting an operation instruction to provide an instruction to release the grasping operation from the controller CON, the CPU 701 controls the control state of the finger mechanism portion 100 to adaptive releasing (step S205). The adaptive releasing is operation to release the holding operation at step S204. The CPU 701 controls ON and OFF of the solenoid valves I to IV into the above-described valve state 9 and controls the extensor 400A into a pressurized sate and the flexor 400B into a depressurized state. By increasing the tension of the extensor tendon 300A and reducing the tension of the flex tendon 300B, the holding operation may be released.

Subsequently, the CPU 701 determines whether or not the grasping work is to be ended (step S206). If an operation instruction concerning a grasping end instruction is accepted from the controller CON, the CPU 701 determines that the grasping work is to be ended. If the CPU 701 determines that the grasping work is not to be ended (S206: NO), the CPU 701 returns the processing to step S202 to execute a series of processing from steps S202 to S205 in order to grasp another object OBJ.

If, on the other hand, determining that the grasping work is to be ended (S206: YES), the CPU 701 controls the control state of the finger mechanism portion 100 to relaxing (step S207). The relaxing is operation for finger pulling to prevent the finger mechanism portion 100 from being in contact with the object OBJ and a box, a container or the like containing the object OBJ and is operation for protecting the tendon 300 and the artificial muscle 400. The CPU 701 controls ON and OFF of the solenoid valves I to IV into the above-described valve state 5, and controls the extensor 400A and the flexor 400B both into a depressurized state.

Figure 13:
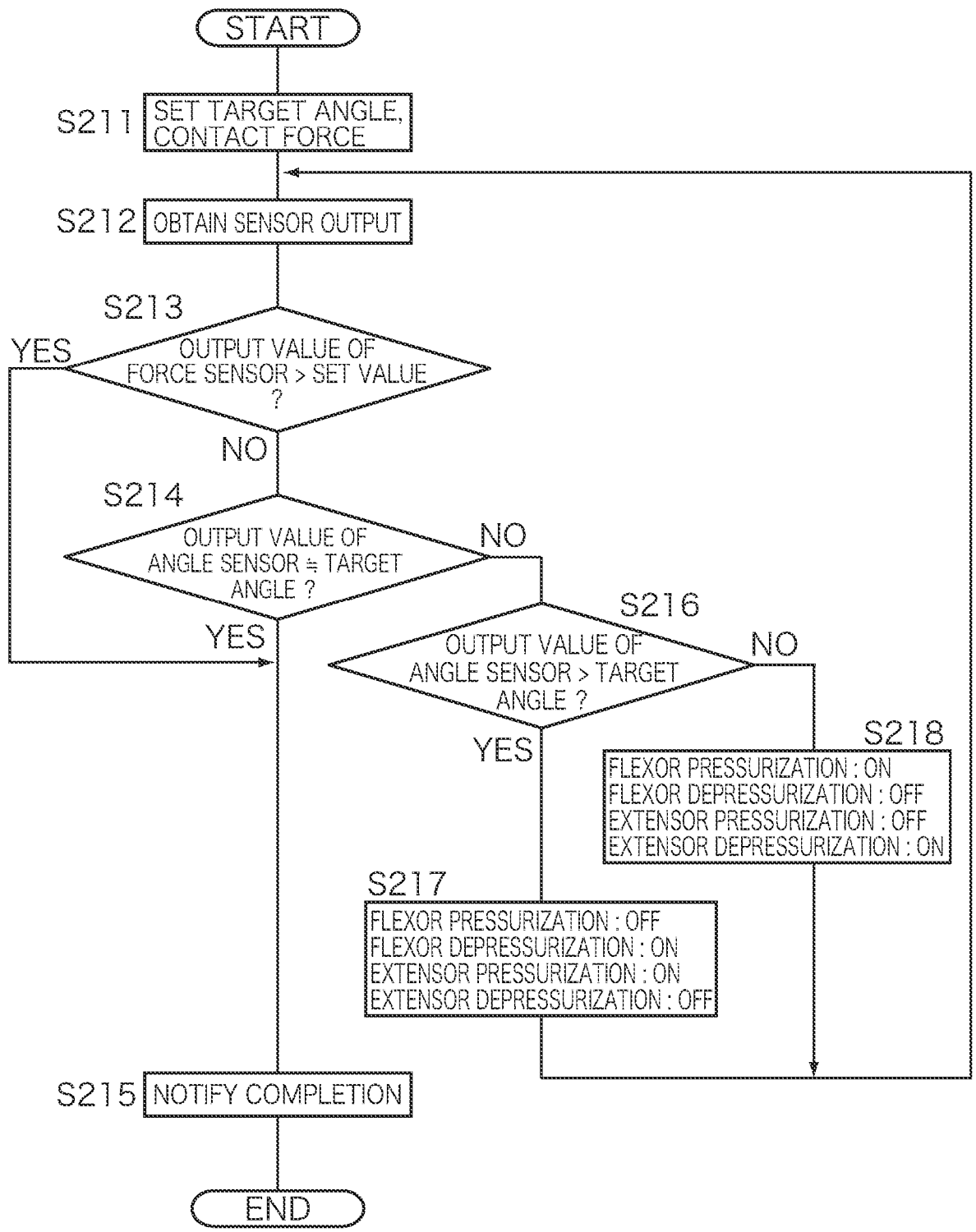
FIG. 13 is a flowchart depicting the control procedure of enclosure formation.

FIG. 13 is a flowchart depicting the control procedure of enclosure formation. The CPU 701 mounted on the control board 700 included in the robot hand 1000 accepts the target angle for the joint angle and the set value of the contact force via the controller CON (step S211).

If obtaining a sensor output from each of the sensors (step S212), the CPU 701 determines whether or not the sensor value from the force sensor 160 is larger than the set value (step S213). If the sensor value from the force sensor 160 is larger than the set value (S213: YES), the CPU 701 notifies the controller CON of completion (step S215) and ends the processing in this flowchart.

If determining that the sensor value from the force sensor 160 is equal to or smaller than the set value (S213: NO), the CPU 701 determines whether or not the joint angle measured by the angle sensor 170 is substantially equal to the target angle (step S214). If determining that the joint angle measured by the angle sensor 170 is substantially equal to the target angle (S214: YES), the CPU 701 provides a notification of completion at step S215 and ends the processing in this flowchart.

If determining that the joint angle indicated by the sensor value from the angle sensor 170 is substantially different from the target angle (S214: NO), the CPU 701 determines whether or not the joint angle measured by the angle sensor 170 is larger than the target angle (step S216).

If determining that the joint angle measured by the angle sensor 170 is larger than the target angle (S216: YES), the CPU 701 controls ON and OFF of the solenoid valves I to IV, and controls the flexors 400B and 432 into a depressurized state and the extensor 400A into a pressurized state (step S217). The processing at step S217 is equivalent to the valve state 9 depicted in FIG. 10, and corresponds to the operation of the adaptive releasing. Namely, that the angle sensor value is higher than the target value means that the distance between the opposing bones is smaller than the target value, resulting in control performed in a direction that increases the distance a little. After controlling to the above-described control state, the CPU 701 returns the processing to step S212.

If, one the other hand, determining that the joint angle measured by the angle sensor 170 is equal to or smaller than the target angle (S216: NO), the CPU 701 controls ON and OFF of the solenoid valves I to IV, and controls the flexors 400B and 432 into a pressurized state and the extensors 400A and 422 into a depressurized state (step S218). The processing at step S218 is equivalent to the valve state 6 depicted in FIG. 10, and corresponds to the operation of "adaptive grasping." Namely, that the angle sensor value is lower than the target value means that the distance between the opposing bones is larger than the target value, resulting in control performed in a direction that reduces the distance a little. After controlling to the above-described control state, the CPU 701 returns the processing to step S212.

Figure 14:
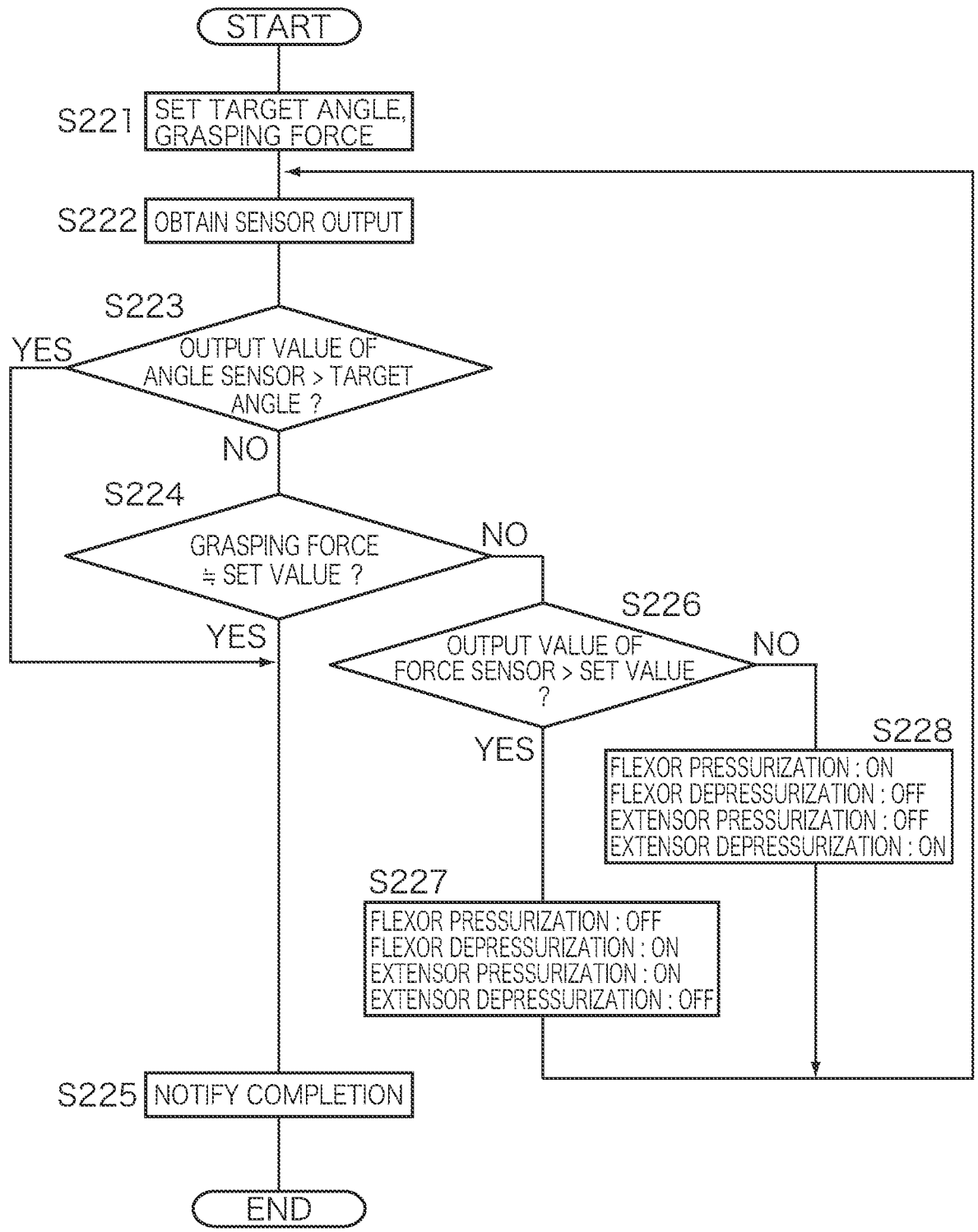
FIG. 14 is a flowchart depicting the control procedure of grasping operation.

FIG. 14 is a flowchart depicting the control procedure of grasping operation. The CPU 701 mounted on the control board 700 included in the robot hand 1000 accepts the target angle for the joint angle and the set value of the contact force via the controller CON (step S221).

If obtaining a sensor output from each of the sensors (step S222), the CPU 701 determines whether or not the joint angle measured by the angle sensor 170 is larger than the target angle (step S223). If determining that the joint angle measured by the angle sensor 170 is larger than the target angle (S223: YES), the CPU 701 notifies the controller CON of completion (step S225), and ends the processing in this flowchart.

If determining that the joint angle measured by the angle sensor 170 is equal to or smaller than the target angle (S223: NO), the CPU 701 determines whether or not the sensor value (i.e., grasping force) from the force sensor 160 is substantially equal to the set value (step S224). If determining that the sensor value from the force sensor 160 is substantially equal to the set value (S224: YES), the CPU 701 provides notification of completion at step S225 and ends the processing in this flowchart.

If determining that the sensor value from the force sensor 160 is substantially different from the set value (S224: NO), the CPU 701 determines whether or not the sensor value from the force sensor 160 is more than the set value (step S226). If determining that the sensor value from the force sensor 160 is more than the set value (S226: YES), the CPU 701 controls ON and OFF of the solenoid valves I to IV, and controls the flexor 400B to a depressurized state and the extensor 400A to a pressurized state (step S227). The processing at step S227 is equivalent to the valve state 9 depicted in FIG. 10, and corresponds to the operation of the adaptive releasing. Namely, that the sensor value is higher than the target value means that the grasping force is great, resulting in control performed in a direction that reduces the grasping force. After controlling to the above-described control state, the CPU 701 returns the processing to step S222.

If determining that the sensor value from the force sensor 160 is equal to or less than the set value (S226: NO), the CPU 701 controls ON and OFF of the solenoid valves I to IV, and controls the flexors 400B and 432 into a pressurized state and the extensors 400A and 422 into a depressurized state (step S228). The processing at step S228 is equivalent to the valve state 6 depicted in FIG. 10, and corresponds to the operation of "adaptive grasping." Namely, that the force sensor value is lower than the target value means that grasping force is small, resulting in control in a direction that increases the grasping force. After controlling to the above-described control state, the CPU 701 returns the processing to step S222.

As described above, feedback control may be executed based on the sensor outputs from the force sensor 160 and the angle sensor 170 in Embodiment 2, which enables compliance control that autonomously controls the grasping form of grasping the object OBJ, the holding force, the flexibility of finger joint and so on.

Embodiment 3

According to Embodiment 3, operation of grasping an object OBJ by using a robot hand 1000 described in Embodiments 1 and 2, and storing it in intimate contact with other objects in a rectangular storage box SB will be described. In the present embodiment, the object OBJ is regarded as a spherical object such as fruits or the like.

Figure 15A:
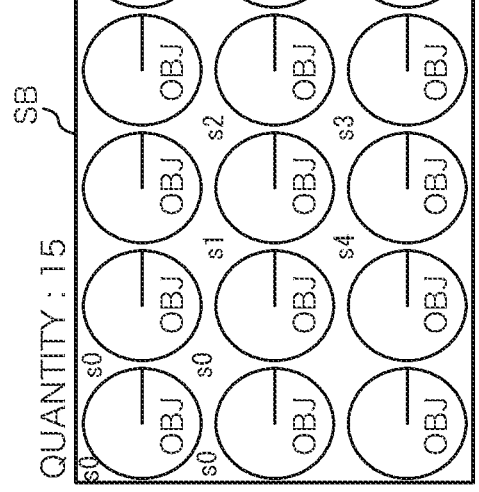
FIGS. 15A to 15D are an illustrative view illustrating stored states.

FIGS. 15A to 15D are an illustrative view illustrating stored states. FIG. 15A illustrates a state where sixteen objects are stored in intimate contact with one another in a rectangular storage box SB. In the state where storing objects OBJ has been completed, six spaces indicated by s1 to s6 are caused when an object OBJ is surrounded by other objects OBJ. Furthermore, three or four spaces indicated by s0 are caused for an object to be grasped that is adjacent to the storage box SB.

Figure 15B:
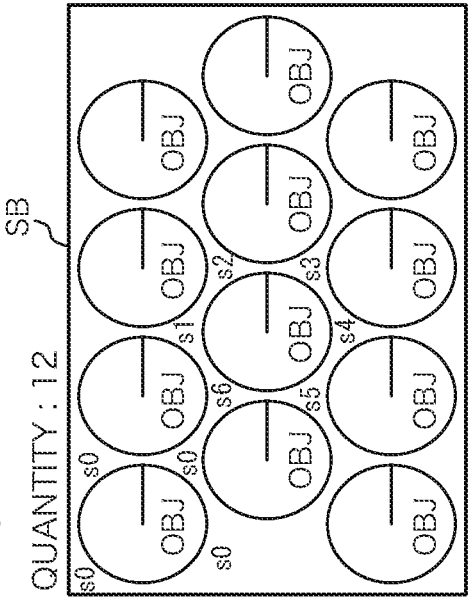
Figure 15C:
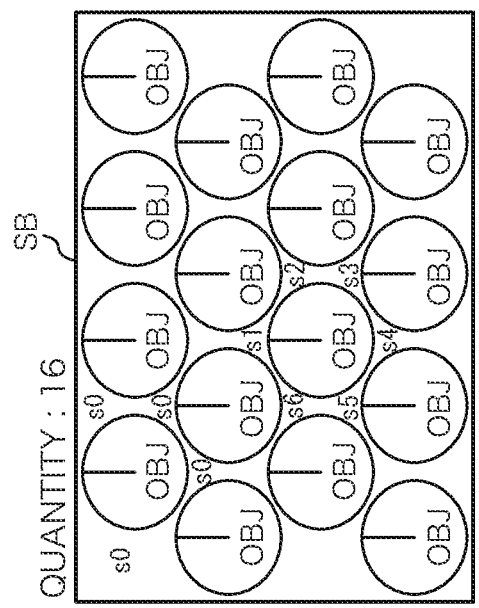
Figure 15D:
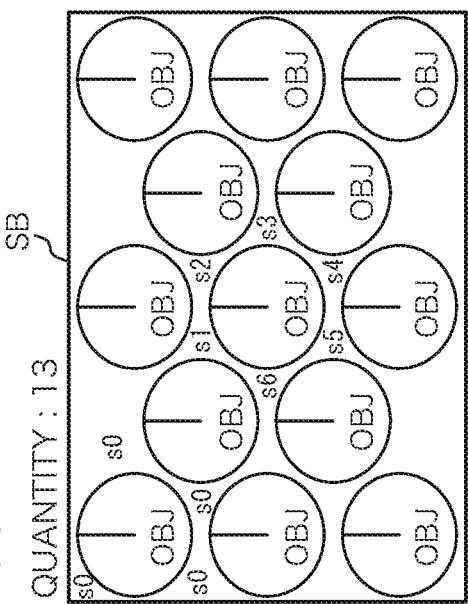

Similarly, FIG. 15B, FIG. 15C and FIG. 15D respectively illustrate states where fifteen, thirteen and twelve objects OBJ are stored in intimate contact with one another, and depict three to six spaces are caused around an object OBJ.

The robot hand 1000 performs intimate contact storing by grasping the object OBJ at the parts that correspond to the positions of the spaces with two fingers 101 and 102, moving it to the storing position, pushing the object OBJ into the position, then releasing and removing the fingers 101 and 102 from the object OBJ.

The robot hand 1000 according to the present embodiment can grasp the object OBJ without opening the fingertip and release the fingers from the grasped object OBJ without opening the fingertip. Thus, in the case where spaces are caused between the objects or between the object and the storage box SB as illustrated in FIG. 15A to FIG. 15D, the robot hand 1000 may store an object OBJ in intimate contact with other objects OBJ by grasping the object OBJ at the parts that correspond to the spaces and moving it into the storage box SB.

However, in the case where an object such as fruits, which is an object OBJ, is enclosed by a cushioning material CSN, when an object OBJ is stored in intimate contact, the cushioning material CSN for the adjacent object OBJ may easily fall off.

Figure 16A:
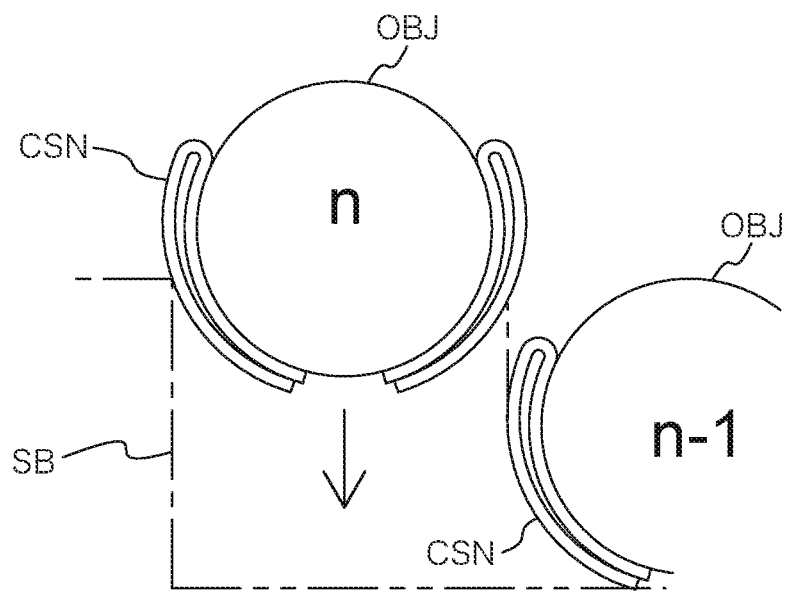
FIGS. 16A and 16B are a schematic view illustrating a state where an object is moved downward and stored.
Figure 16B:
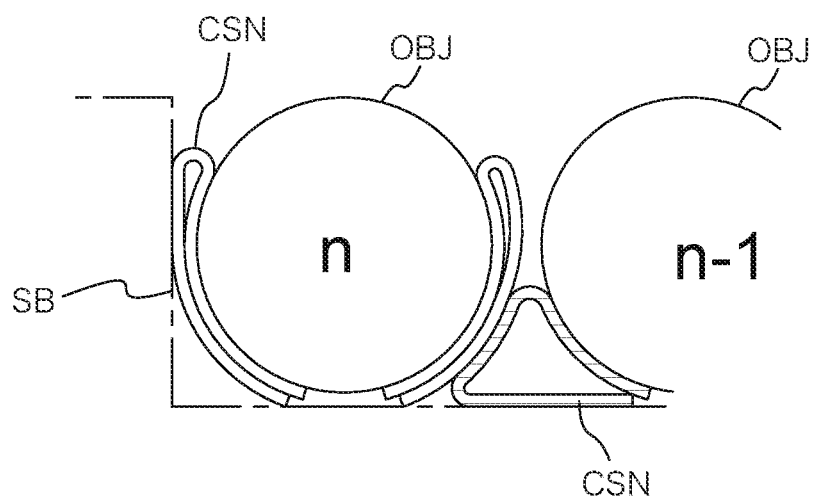

FIGS. 16A and 16B are a schematic view illustrating a state where an object OBJ is moved downward and stored. FIG. 16A illustrates a state where an n−1-th object OBJ has already been stored in the storage box SB, and an n-th object OBJ is intended to be stored in the space formed between the n−1-th object OBJ and the storage box SB. FIG. 16B illustrates a state where storing of the n-th object OBJ has already been completed. The cushioning material CSN has a structure such that a cylindrical elastic material is folded at the middle, for example, and is attached so as to squeeze between the objects OBJ from the folded direction. Thus, if force is applied to the folded portion from above, the cushioning material CSN is easily slipped off as depicted in FIG. 16B.

Figure 17A:
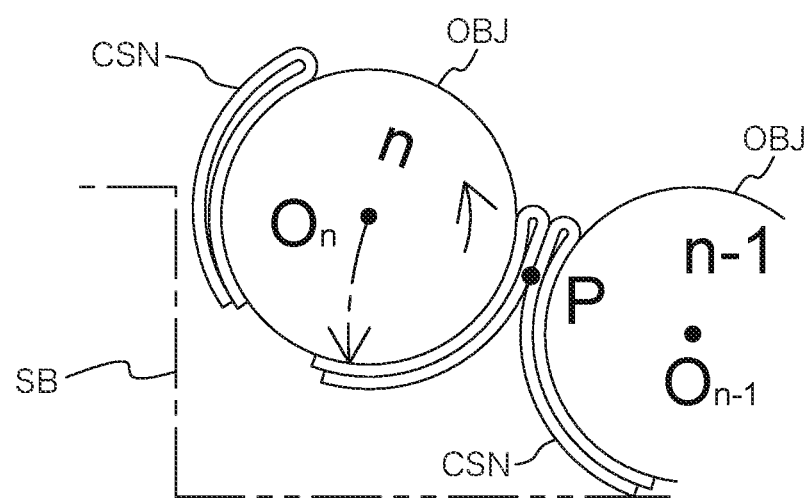
FIGS. 17A and 17B are a schematic view illustrating a state where an object is stored by rolling storage.
Figure 17B:
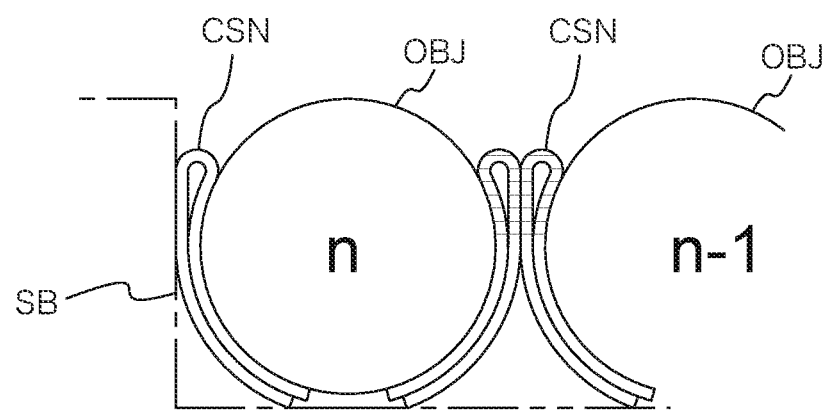

FIGS. 17A and 17B are a schematic view illustrating a state where an object OBJ is stored by rolling storage. FIG. 17A illustrates a state where an n−1-th object OBJ has already been stored in the storage box SB, and an n-th object OBJ is intended to be stored in the space formed between the n−1-th object OBJ and the storage box SB. FIG. 17B illustrates a state where the n-th object OBJ has already been stored. According to the present embodiment, in the case where the n-th object OBJ is stored in the space described above, by storing the n-th object in a rolling manner around the n−1-th object OBJ without slipping over it (rolling storage), the cushioning material CSN is prevented from falling off.

After completion of storing the object, in the case where the fingertip of the robot hand is released and opened upon removal from the object OBJ, the slippage of the cushioning material CSN and the lift of the stored object OBJ occur due to the interference, friction or the like between the cushioning material CSN or the storage box SB and the robot hand. However, since the robot hand 1000 according to the present embodiment can remove the fingers 101 and 102 from the object without opening the fingertip, the slippage of the cushioning material CSN and the lift of the stored object OBJ occurring when the fingers 101 and 102 are pulled out from the storage box SB can be prevented.

The following describes rolling storage.

Figure 18:
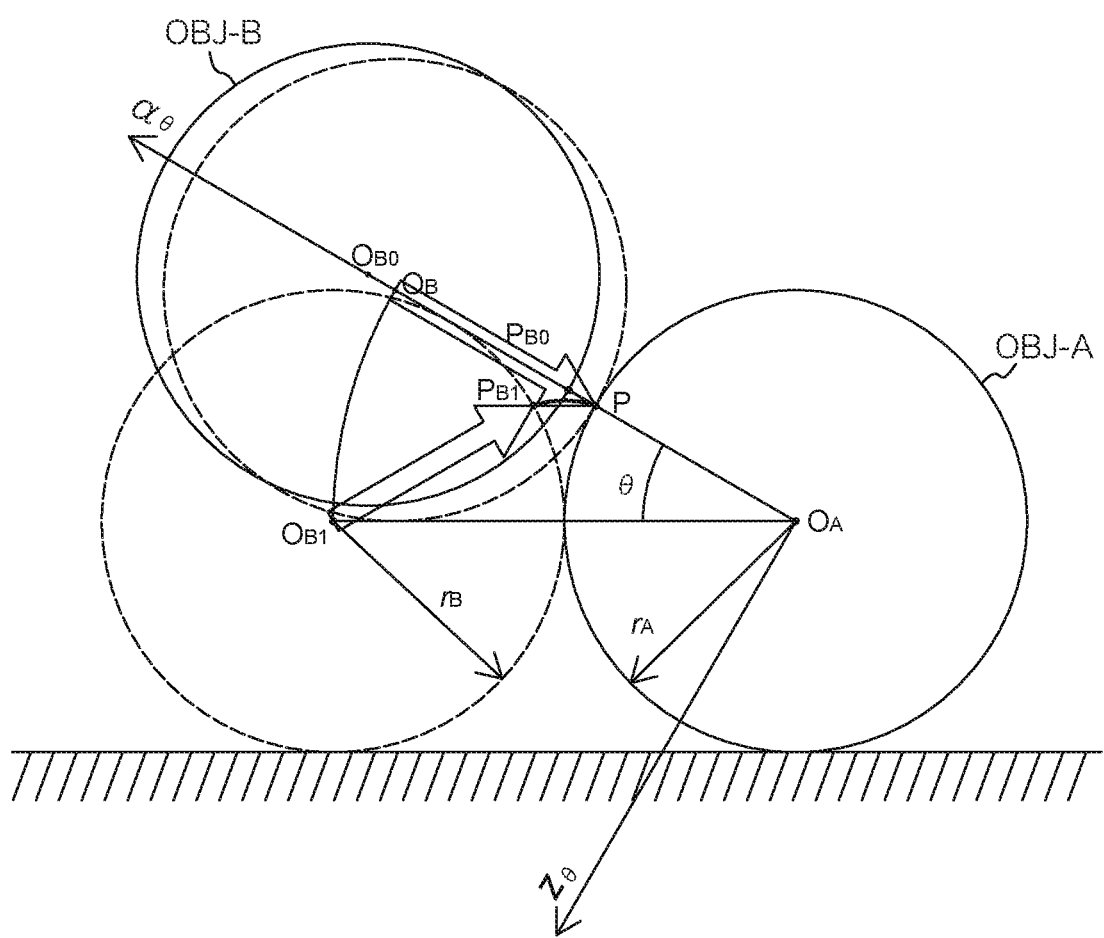
FIG. 18 is an illustrative view illustrating the rolling storage.

FIG. 18 is an illustrative view illustrating rolling storage. FIG. 18 illustrates a state where another object OBJ-B is being stored in intimate contact with the stored object OBJ-A. Note that in FIG. 18, the object OBJ-A and the object OBJ-B both of which are attached with cushioning materials CSN are depicted by circles for the sake of simplicity. As illustrated in FIG. 18, in the case where the object OBJ-B is rolled from a state where it is in intimate contact with the object OBJ-A at the point P along the object OBJ-A, the slippage of the cushioning material CSN is prevented, which prevents the cushioning material CSN from falling off.

Assuming that the object OBJ-A is a fixed circle having its center $O_A$, and the object OBJ-B is a movable circle having its center $O_B$, the object OBJ-B moves along the locus illustrated in FIG. 18. That is, when the object OBJ-B is rolled from a state where it is in intimate contact with the object OBJ-A at the points P along the object OBJ-A without being slipped, the point P on the object OBJ-B moves to a point $P_{B1}$, the locus of which forms an epicycloid curve. Assuming that the radius of the circle of the object OBJ-A is $r_A$, and the radius of the circle of the object OBJ-B is $r_B$, the following relational expression can be obtained.

$$\alpha_\theta = (r_A + r_B)\cos\theta - r_B \cos((r_A + r_B)/r_B)\theta,$$

$$Z_\theta = (r_A + r_B)\sin\theta - r_B \sin((r_A + r_B)/r_B)\theta.$$

By incorporating the coordinates evaluated from the above-described relational expression into the coordinate calculation for the control of the robot hand 1000 and performing control of moving the vector $O_B$-P to the vector $O_{B1}$-$P_{B1}$, the rolling storage can be achieved. Here, the $O_B$-P is referred to as a rolling vector, and $r_B$ is referred to as a rolling radius.

Figure 19:
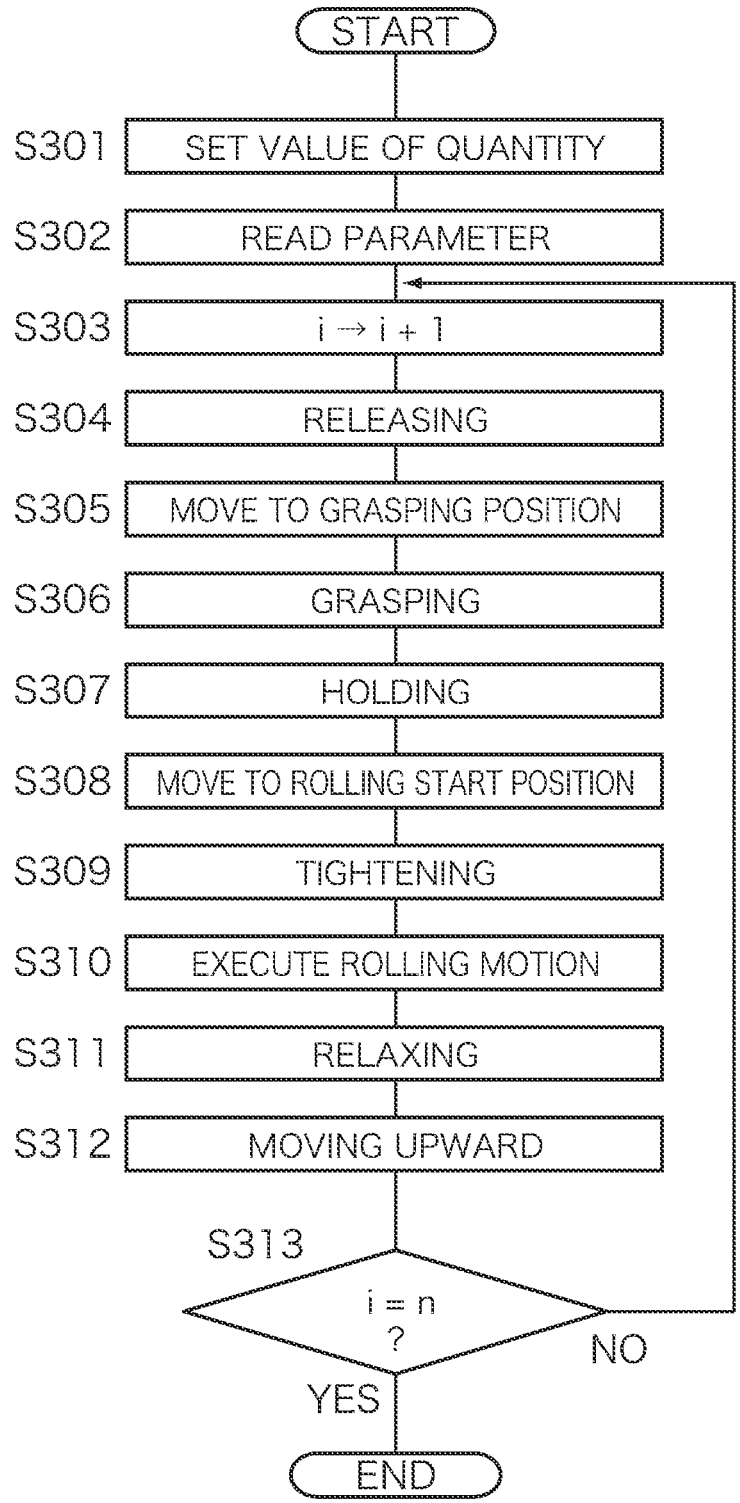
FIG. 19 is a flowchart depicting the control procedure of a robot hand according to Embodiment 3.

FIG. 19 is a flowchart depicting the control procedure of a robot hand 1000 according to Embodiment 3. The controller CON accepts the set value of quantity (step S301). Here, the quantity is the maximum number of the object OBJ to be stored in the storage box SB. The value of the quantity set in step S301 is defined as n.

Next, the controller CON performs reading of the storing position of the object OBJ and the parameters concerning the rolling storage (step S302). FIG. 20 is a conceptual view illustrating one example of the parameters to be read by the CPU 701. Depending on the quantity n of the object OBJ to be stored in the storage box SB, the storing position of each of the objects OBJ in the storage box SB and the rolling parameters can be set. The coordinates (X0, Y0, Z0) of the gripping position are fixed regardless of the quantity n. Here, the storing position of the object OBJ can be described as three-dimensional coordinates in the three-dimensional orthogonal coordinate system regarding a specific position as the origin. Furthermore, α in the rolling parameter represents an angle on the plane when an object OBJ is stored. The $r_A$ and $r_B$ both represent radii of the above-mentioned fixed circle and the movable circle, respectively, and θ represents an angle on a vertical plane (angle formed by the line segment P-$O_A$ and the line segment $O_{B1}$-$O_A$ in FIG. 18) when the object OBJ is stored. Such parameters are previously stored in a storage device (not illustrated) such as a memory included in the controller CON.

The controller CON increments the value i of the counter indicating the number of stored objects by 1 (step S303). The initial value of the counter indicating the number of stored objects is 0, for example.

Subsequently, the controller CON causes the robot ROB to output an operation instruction concerning releasing to the robot hand 1000 by providing the robot ROB with a control condition and thereby causes the fingers 101 and 102 contained in the robot hand 1000 to be released (step S304). At this time, the CPU 701 included in the robot hand 1000 performs pressurization control on the extensor 400A and depressurization control on the flexor 400B to thereby cause each of the fingers 101 and 102 to be released.

Next, the controller CON controls the operation of the arm parts included in the robot ROB by providing the robot ROB with a control condition and thereby makes the robot hand 1000 move to a grasping position (step S305). It is noted that a well-known control method can be employed for control on the operation of the arm parts to move the robot hand 1000 to the grasping position.

The controller CON then causes the robot ROB to output an operation instruction concerning grasping to the robot hand 1000 by providing the robot ROB with a control condition and thereby causes the fingers 101 and 102 included in the robot hand 1000 to grasp the object OBJ (step S306). At this time, the CPU 701 included in the robot hand 1000 performs depressurization control on the extensor 400A and pressurization control on the flexor 400B to thereby cause each of the fingers 101 and 102 to grasp the object OBJ.

Subsequently, the controller CON then causes the robot ROB to output an operation instruction concerning holding by providing the robot ROB with a control condition and thereby causes the fingers 101 and 102 contained in the robot hand 1000 to hold the object OBJ (step S307). At this time, the CPU 701 included in the robot hand 1000 controls the extensor 400A and the flexor 400B into OFF to cause each of the fingers 101 and 102 to hold the object OBJ.

Next, the controller CON controls the operation of the arm parts contained in the robot ROB by providing the robot ROB with a control condition and moves the robot hand 1000 to a starting point of rolling (step S308). It is noted that a known control method can be employed for control on the operation of the arm parts to move the robot hand 1000 to the starting point of rolling. By the operation at step S308, the object OBJ grasped by the robot hand 1000 can be made in contact with the stored object OBJ at the angle θ set by the rolling parameters.

The controller CON then causes the robot ROB to output an operation instruction concerning tightening to the robot hand 1000 by providing the robot ROB with a control condition and thereby causes the fingers 101 and 102 provided in the robot hand 1000 to additionally tighten the object OBJ (step S309). At this time, the CPU 701 included in the robot hand 1000 controls the extensor 400A into OFF and performs pressurization control on the flexor 400B to thereby cause the fingers 101 and 102 to additionally tighten the object OBJ.

Next, the controller CON controls the operation of the arm parts included in the robot ROB by providing the robot ROB with a control condition and thereby causes it to execute a rolling motion of the grasped object OBJ (step S310). The operation procedure of the rolling motion will be described later.

In the case where the grasped object OBJ is stored in a predetermined storing position after completion of the rolling motion, the controller CON causes the robot ROB to output an operation instruction concerning relaxing to the robot hand 1000 by providing the robot ROB with a control condition and thereby relaxes the fingers 101 and 102 included in the robot hand 1000 (step S311). At this time, the CPU 701 provided in the robot hand 1000 performs depressurization control on the extensor 400A and the flexor 400B to relax each of the fingers 101 and 102.

Next, the controller CON controls the operation of the arm parts included in the robot ROB by providing the robot ROB with a control condition and thereby moves upward the robot hand 100 (step S312). According to the present embodiment, since the robot hand 1000 is moved upward in a state where the fingers 101 and 102 are relaxed, the slippage of the cushioning material CSN and the lift of the stored object OBJ can be prevented.

Subsequently, the controller CON determines whether or not the counter value i is equal to the quantity n (step S313). If the counter value i is not equal to the quantity n (S313: NO), the controller CON returns the processing to step S303 to continuously perform the operation to store the remaining objects OBJ in the storage box SB. If, on the other hand, the counter value i is equal to the quantity n (S313: YES), the controller CON ends the processing in this flowchart.

Figure 21:
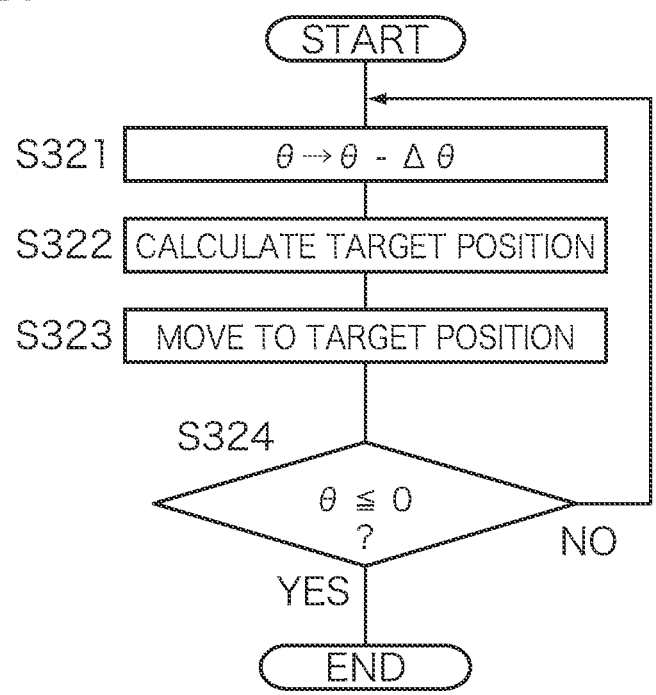
FIG. 21 is a flowchart depicting the operation procedure of rolling motion.

FIG. 21 is a flowchart depicting the operation procedure of rolling motion. The controller CON subtracts $\Delta\theta$ from the angle $\theta$ on the vertical plane of the object OBJ to be stored (step S321). It is noted that $\Delta\theta$ is the amount of change in the angle that can be suitably set depending on the object OBJ and is assumed as previously stored in a storage device such as a memory or the like (not illustrated).

Next, the controller CON calculates the target position of the object OBJ (step S322). In the case where the three-dimensional coordinates of the object OBJ is (Xi, Yi, Zi) when the counter value is i, the controller CON can calculate the coordinates (X, Y, Z) of the target position from the following arithmetic expressions, for example.

$$X=X_i+*((r_{Ai}+r_{Bi})\times\cos\theta_i-r_{Bi}\times\cos((r_{Ai}+r_{Bi})/r_{Bi})\times\theta_i)\times\cos\alpha_i,$$

$$Y=Y_i+((r_{Ai}+r_{Bi})\times\cos\theta_i-r_{Bi}\times\cos((r_{Ai}+r_{Bi})/r_{Bi})\times\theta_i)\times\sin\alpha_i,$$

$$Z=Z_i+((r_{Ai}+r_{Bi})\times\sin\theta_i-r_{Bi}\times\sin((r_{Ai}+r_{Bi})/r_{Bi})\times\theta_i)$$

Then, the controller CON controls the operation of the arm parts included in the robot ROB by providing the robot ROB with a control condition and moves the robot hand 1000 such that the central coordinates of the grasped object OBJ match the coordinates (X, Y, Z) (step S323). Note that a known control method can be employed for the operation control on the arm parts to move the robot hand 1000 to a specific position.

Subsequently, the controller CON determines whether or not the angle $\theta$ on the vertical plane of the object OBJ is equal to or smaller than 0 (step S324). If the angle $\theta$ on the vertical plane of the object OBJ is larger than 0 (S324: NO), the controller CON returns the processing to step S321 and continues to move the object OBJ since it determines that storing has not been completed. Furthermore, if the angle $\theta$ on the vertical plane of the object OBJ is equal to or smaller than 0 (S324: YES), the controller CON ends the processing in this flowchart since it determines that storing has been completed.

It is noted that in the flowchart illustrated in FIG. 19, rolling storage is configured to be applied to all the objects to be stored in the storage box SB, but if enough space is ensured within the storage box SB, an object OBJ may be stored in a predetermined storing position by translation of the robot hand 1000.

Figure 22:
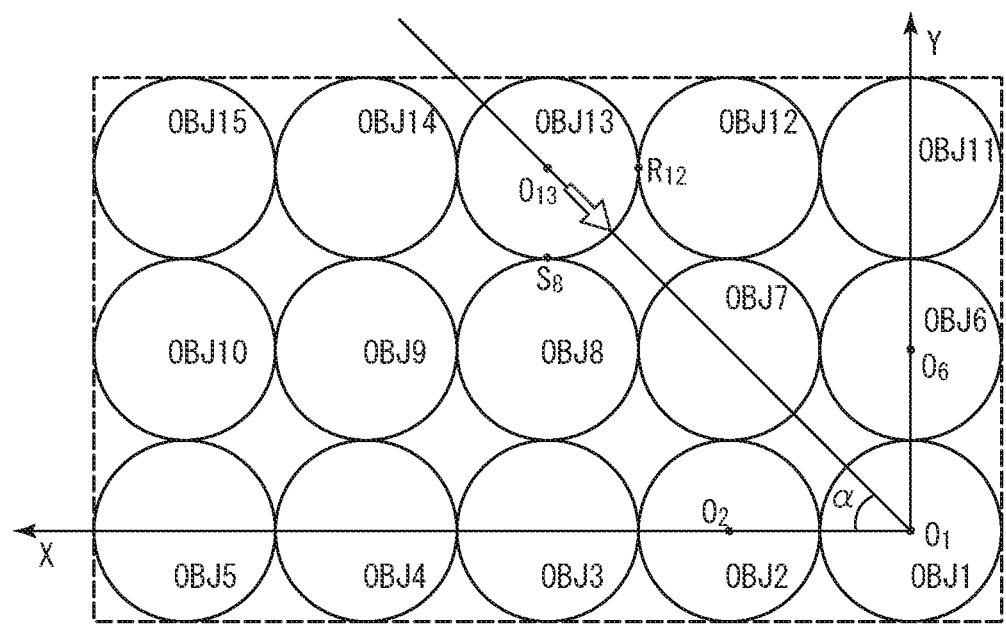
FIG. 22 is an illustrative view illustrating a storing order.

FIG. 22 is an illustrative view illustrating a storing order. When fifteen objects OBJ1-OBJ15 are stored in the storage box SB, assumed is a procedure for successively storing the object OBJ1, the object OBJ2, the object OBJ3, . . . , the object OBJ15 in this order. When the object OBJ1 is stored in the storage box SB, enough space can be ensured since the other objects OBJ2-OBJ15 do not exist in the storage box SB. In this case, by translation of the robot hand 1000 inside the storage box SB in the direction indicated by the hollow arrow in the drawing without application of the rolling storage, for example, the object OBJ1 can be stored in a predetermined storing position. This also applies to each of the objects OBJ2-OBJ4 and OBJ6-OBJ9, and each of the objects can be stored in a predetermined storing position only by the translation of the robot hand 1000.

Meanwhile, in the case where the object OBJ5 or each of the objects OBJ10-OBJ15 is stored in the storage box SB, enough space allowing for translation cannot be ensured, so that rolling storage is required. For example, in a case where the object OBJ13 is newly stored in the state where the objects OBJ1-OBJ12 have already been stored, the object OBJ13 is moved in a direction indicated by the hollow arrow illustrated in the drawing, and rolling storage is executed in the state where the object OBJ13 is in contact with the objects OBJ8 and OBJ12 at the contact points S8 and R12. Here, in the case where the line segment on the horizontal plane connecting the center $O_1$ of the object OBJ1 and the center $O_2$ of the object OBJ 2 is regarded as an X axis, and the line segment on the horizontal plane connecting the center $O_1$ of the object OBJ1 and the center $O_6$ of the object OBJ6 is regarded as a Y axis, the axis vertical to the X axis and the Y axis is an Z axis, the line segment on the horizontal plane connecting the center $O_1$ of the object OBJ1 and the center $O_{13}$ of the object OBJ13 is an a axis, and the angle formed by the X axis and the $\alpha$ axis is $\alpha$ in the above-described arithmetic expressions.

This also applies to the case where each of the objects OBJ11-OBJ12 and OBJ14-OBJ15 is stored in the storage box SB, and rolling storage is executed in the state where an object OBJ is made in contact with another stored object OBJ at two points (or one point), whereby each of the objects can be stored into the storage box SB while preventing the cushioning material CSN from falling off.

It is to be understood that the embodiments disclosed here is illustrative in all respects and not restrictive. The scope of the present invention is defined by the appended claims, and all changes that fall within the meanings and the bounds of the claims, or equivalence of such meanings and bounds are intended to be embraced by the claims.

What is claimed is:

1. A finger mechanism comprising:
   a base portion; and
   a plurality of finger portions supported by the base portion, wherein each of the finger portions includes:
  a first bone member;
  a second bone member rotatably coupled to one end portion of the first bone member; and
  a pair of third bone members each being rotatably coupled to another end portion of the first bone member and the base portion, and forming a parallel link mechanism between the first bone member and the base portion, and
the finger mechanism further comprises:
  an extensor tendon that is disposed on a side where the second bone member extends with respect to the first bone member, and extending along the second bone member, the first bone member and one of the pair of third bone members;
  an extensor connected to the extensor tendon, and extends and flexes the extensor tendon;
  a flex tendon that is disposed on a side where the second bone member flexes with respect to the first bone member, and extending along the second bone member, the first bone member and another of the pair of third bone members; and
  a flexor connected to the flex tendon, and extends and flexes the flex tendon.

2. The finger mechanism according to claim 1, wherein the extensor tendon and the flex tendon are elastic bodies that are extended by traction forces of the extensor and the flexor, respectively, and
where a cross-sectional area of the extensor tendon and the flex tendon is A, a Young's modulus is E and a distortion is ε, an internal tension F caused on the extensor tendon and the flex tendon is given by F=A× E×ε, and when a free length and an extended amount for each of the extensor tendon and the flex tendon are L0 and ΔL, the distortion c is expressed by ε=ΔL/L0.

3. The finger mechanism according to claim 1, wherein the extensor tendon and the flex tendon include a core portion and a sheath portion that protects the core portion.

4. The finger mechanism according to claim 3, wherein the core portion is a synthetic resin fiber with a Young's modulus of 0.5 GPa to 2.0 GPa.

5. The finger mechanism according to claim 1, wherein the extensor and the flexor are Mckibben air-driven actuators.

6. A robot hand comprising:
the finger mechanism according to claim 1;
a pressurizing solenoid valve and a depressurizing solenoid valve provided midway on a supply path to supply compressed air to the Mckibben air-driven actuators included in the finger mechanism; and
a control unit that controls opening and closing of the pressurizing solenoid valve and the depressurizing solenoid valve, wherein
the control unit controls opening and closing of the pressurizing solenoid valve and the depressurizing solenoid valve and controls degrees of contraction of the extensor and the flexor included in the finger mechanism by adjusting an air pressure in the air-driven actuators.

7. A robot hand controlling method, wherein the robot hand includes: the finger mechanism according to claim 1; a pressurizing solenoid valve and a depressurizing solenoid valve provided midway on a supply path to supply compressed air to the Mckibben air-driven actuators constituting the extensor and the flexor of the finger mechanism; and a control unit that controls opening and closing of the pressurizing solenoid valve and the depressurizing solenoid valve and controls degrees of contraction of the extensor and the flexor, the method comprising:
  executing a control of opening and closing of the pressurizing solenoid valve and the depressurizing solenoid valve in order to execute at least one of the following operations by the control unit,
  wherein the operation includes:
  a fixing operation to make antagonistic to each other traction forces of the extensor tendon and the flex tendon included in the finger mechanism before an operation to grasp an object;
  an adaptive grasping operation to grasp the object according to a shape of the object;
  a holding operation to hold a grasped state;
  an adaptive releasing operation to release the holding operation; and
  a relaxing operation to relax the extensor and the flexor.

8. The robot hand controlling method according to claim 7, wherein
when the fixing operation is executed, the control unit performs control to open the pressurizing solenoid valve and close the depressurizing solenoid valve used for each of the air-driven actuators constituting the extensor and the flexor.

9. The robot hand controlling method according to claim 7, wherein
when the adaptive grasping operation is executed, the control unit performs control to close the pressurizing solenoid valve and open the depressurizing solenoid valve used for the air-driven actuator constituting the extensor and performs control to open the pressurizing solenoid valve and close the depressurizing solenoid valve used for the air-driven actuator constituting the flexor.

10. The robot hand controlling method according to claim 7, wherein
when the holding operation is executed, the control unit performs control to close the pressurizing solenoid valve and the depressurizing solenoid valve used for each of the air-driven actuators constituting the extensor and the flexor.

11. The robot hand controlling method according to claim 7, wherein
when the adaptive releasing operation is executed, the control unit performs control to open the pressurizing solenoid valve and close the depressurizing solenoid valve used for the air-driven actuator constituting the flexor, and performs control to close the pressurizing solenoid valve and open the depressurizing solenoid valve used for the air-driven actuator constituting the flexor.

12. The robot hand controlling method according to claim 7, wherein
when the relaxing operation is executed, the control unit performs control to close the pressurizing solenoid valve and open the depressurizing solenoid valve used for each of the air-driven actuators constituting the extensor and the flexor.

13. The robot hand controlling method according to claim 7, wherein
when a spherical object is held by the robot hand and stored in a storage portion, the control unit performs control to move the spherical object held by the robot hand so that the object rolls on a surface of a stored object that has already been stored in the storage portion.

14. The robot hand controlling method according to claim 13, wherein
> the control unit moves the spherical object such that a locus of a point on the spherical object that is made in contact with the stored object forms an epicycloid curve.

15. The robot hand controlling method according to claim 14, wherein
> the control unit moves the spherical object according to parameters that determine the number of objects stored in the storage portion, a storing position and the locus.

* * * * *